(12) United States Patent
Ueda

(10) Patent No.: US 12,528,403 B2
(45) Date of Patent: Jan. 20, 2026

(54) LIGHTING CONTROL DEVICE, LIGHTING CONTROL METHOD, AND VEHICLE

(71) Applicant: SONY GROUP CORPORATION, Tokyo (JP)

(72) Inventor: Arinobu Ueda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/720,718

(22) PCT Filed: Dec. 15, 2022

(86) PCT No.: PCT/JP2022/046135
§ 371 (c)(1),
(2) Date: Jun. 17, 2024

(87) PCT Pub. No.: WO2023/127511
PCT Pub. Date: Jul. 6, 2023

(65) Prior Publication Data
US 2025/0050802 A1 Feb. 13, 2025

(30) Foreign Application Priority Data

Dec. 27, 2021 (JP) ................. 2021-212696

(51) Int. Cl.
*B60Q 1/26* (2006.01)
*B60Q 1/50* (2006.01)
*B60Q 1/52* (2006.01)

(52) U.S. Cl.
CPC ............. *B60Q 1/2611* (2013.01); *B60Q 1/52* (2013.01); *B60Q 1/543* (2022.05)

(58) Field of Classification Search
CPC ........ B60Q 1/2611; B60Q 1/52; B60Q 1/543; B60Q 1/268; B60Q 1/50; B60Q 3/208;
(Continued)

(56) References Cited

U.S. PATENT DOCUMENTS 10,358,084 B2 * 7/2019 Salter .................... B60Q 3/208
10,576,893 B1 * 3/2020 Salter .................... G03B 21/60
(Continued)

FOREIGN PATENT DOCUMENTS

JP  2013-517989 A  5/2013
JP  2015-529587 A  10/2015
(Continued)

OTHER PUBLICATIONS

English translation of Okimoto JP-2021095783-A (Year: 2021).*
International Search Report and Written Opinion of PCT Application No. PCT/JP2022/046135, issued on Feb. 28, 2023, 12 pages of ISRWO.

*Primary Examiner* — Evan P Dzierzynski
(74) *Attorney, Agent, or Firm* — CHIP LAW GROUP

(57) ABSTRACT

The present technology relates to a lighting control device that enables effective use of a roof light disposed along the outer periphery of a roof window of the vehicle, a lighting control method, and a vehicle. A lighting control device includes a light control unit that controls a roof light disposed along the outer periphery of a roof window of a vehicle, on the basis of at least one of a state of the vehicle, a situation around the vehicle, a situation inside the vehicle, or an operation on the vehicle. The present technology can be applied to a vehicle that has a roof window, for example.

19 Claims, 25 Drawing Sheets

(58) Field of Classification Search
CPC .............. B60Q 3/80; B60Q 1/00; B60Q 1/26;
B60Q 3/267; B60Q 3/74; B60Q 5/00;
F21V 9/40; F21V 23/00
See application file for complete search history.

(56) References Cited

U.S. PATENT DOCUMENTS

| | | | |
|---|---|---|---|
| 10,870,393 B1* | 12/2020 | Forgette | B60Q 3/208 |
| 2011/0128141 A1* | 6/2011 | Purks | B60Q 1/381 |
| | | | 340/475 |
| 2013/0238167 A1* | 9/2013 | Stanfield | G08G 1/20 |
| | | | 701/2 |
| 2017/0330464 A1* | 11/2017 | Yoo | B60T 7/22 |
| 2018/0319320 A1* | 11/2018 | Tatara | B60Q 1/507 |
| 2019/0001875 A1* | 1/2019 | Xu | B60Q 3/54 |
| 2021/0086754 A1* | 3/2021 | Kim | B60W 50/08 |
| 2021/0206343 A1* | 7/2021 | Welk | G08B 7/06 |
| 2023/0166656 A1* | 6/2023 | Young | B60J 7/043 |
| | | | 296/216.08 |

FOREIGN PATENT DOCUMENTS

| | | |
|---|---|---|
| JP | 2016-135631 A | 7/2016 |
| JP | 2017-081491 A | 5/2017 |
| JP | 2019-519422 A | 7/2019 |
| JP | 2020-183228 A | 11/2020 |
| JP | 2021-066428 A | 4/2021 |
| JP | 2021-091408 A | 6/2021 |
| JP | 2021095783 A * | 6/2021 |

* cited by examiner

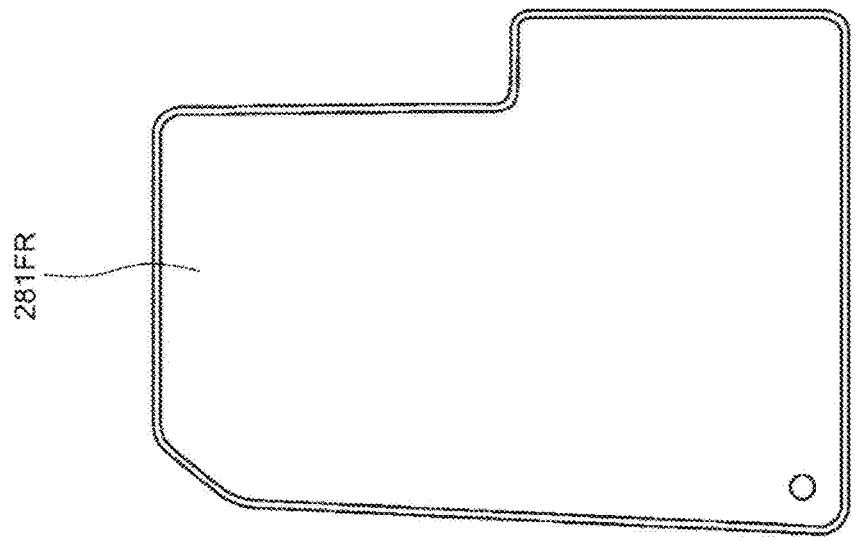
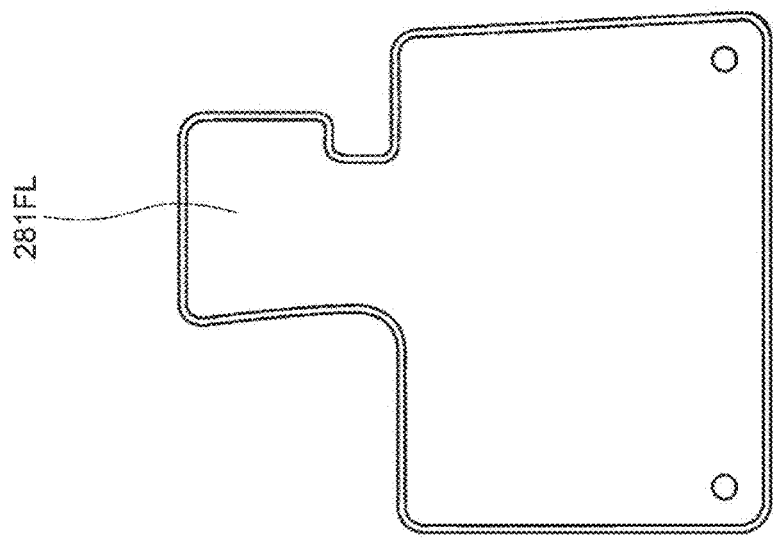
FIG. 23

LIGHTING CONTROL DEVICE, LIGHTING CONTROL METHOD, AND VEHICLE

CROSS REFERENCE TO RELATED APPLICATIONS

This application is a U.S. National Phase of International Patent Application No. PCT/JP2022/046135 filed on Dec. 15, 2022, which claims priority benefit of Japanese Patent Application No. JP 2021-212696 filed in the Japan Patent Office on Dec. 27, 2021. Each of the above-referenced applications is hereby incorporated herein by reference in its entirety.

TECHNICAL FIELD

The present technology relates to a lighting control device, a lighting control method, and a vehicle, and more particularly, to a lighting control device that control lights disposed along the outer periphery of a roof window, a lighting control method, and a vehicle.

BACKGROUND ART

There has been a suggestion to dispose a light along the outer periphery of a roof window (roof light window) of a vehicle (see Patent Document 1, for example).

CITATION LIST

Patent Document

Patent Document 1: Japanese Patent Application Laid-Open No. 2021-66428

SUMMARY OF THE INVENTION

Problems to be Solved by the Invention

In Patent Document 1, however, it is assumed that a roof light disposed along the outer periphery of the roof window is to be used only for illumination and decoration inside the vehicle.

The present technology has been made in view of such circumstances, and enables effective use of a roof light disposed along the outer periphery of a roof window of a vehicle.

Solutions to Problems

A lighting control device according to a first aspect of the present technology includes a light control unit that controls a roof light disposed along the outer periphery of a roof window of a vehicle, on the basis of at least one of a state of the vehicle, a situation around the vehicle, a situation inside the vehicle, or an operation on the vehicle.

A lighting control method according to the first aspect of the present technology includes controlling a roof light disposed along the outer periphery of a roof window of a vehicle, on the basis of at least one of a state of the vehicle, a situation around the vehicle, a situation inside the vehicle, or an operation on the vehicle.

A vehicle according to a second aspect of the present technology is a vehicle that has a roof window, and includes: a roof light disposed along the outer periphery of the roof window; and a light control unit that controls the roof light, on the basis of at least one of a state of the vehicle, a situation around the vehicle, a situation inside the vehicle, or an operation on the vehicle.

In the first aspect or the second aspect of the present technology, a roof light disposed along the outer periphery of a roof window of a vehicle is controlled on the basis of at least one of a state of the vehicle, a situation around the vehicle, a situation inside the vehicle, or an operation on the vehicle.

BRIEF DESCRIPTION OF DRAWINGS

FIG. 23 is a plan view of floor mats.

MODE FOR CARRYING OUT THE INVENTION

Hereinafter, modes for carrying out the present technology will be described. Explanation will be made in the following order.

1. Example Configuration of a Vehicle Control System
2. Embodiment

3. Modifications
4. Others

1. Example Configuration of a Vehicle Control System

Figure 1:
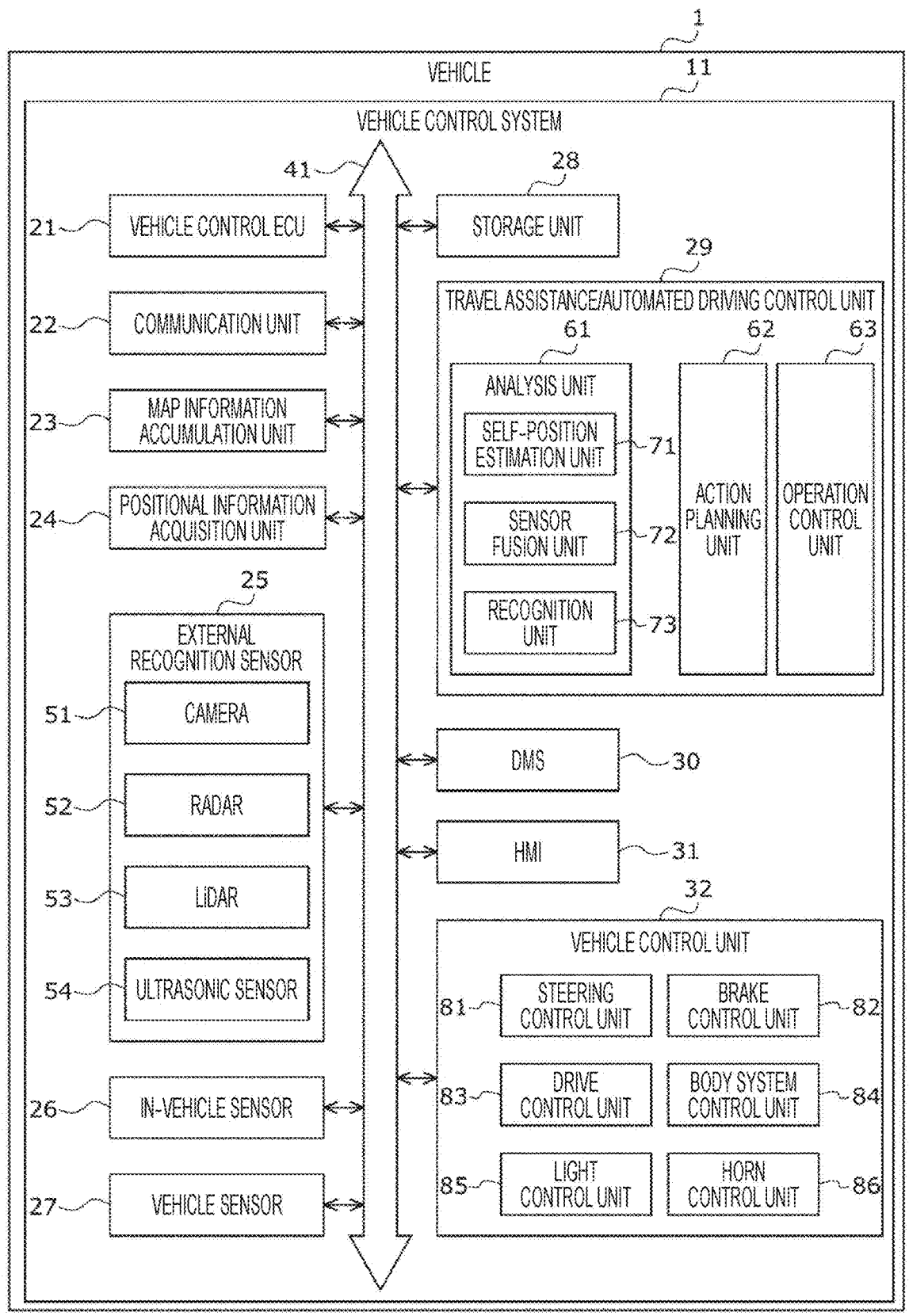
FIG. 1 is a block diagram illustrating a configuration example of a vehicle control system.

FIG. 1 is a block diagram illustrating an example configuration of a vehicle control system 11 that is an example of a moving apparatus control system to which the present technology is applied.

The vehicle control system 11 is provided in a vehicle 1, and performs processing relating to travel assistance and automated driving of the vehicle 1.

The vehicle control system 11 includes a vehicle control electronic control unit (ECU) 21, a communication unit 22, a map information accumulation unit 23, a positional information acquisition unit 24, an external recognition sensor 25, an in-vehicle sensor 26, a vehicle sensor 27, a storage unit 28, a travel assistance/automated driving control unit 29, a driver monitoring system (DMS) 30, a human machine interface (HMI) 31, and a vehicle control unit 32.

The vehicle control ECU 21, the communication unit 22, the map information accumulation unit 23, the positional information acquisition unit 24, the external recognition sensor 25, the in-vehicle sensor 26, the vehicle sensor 27, the storage unit 28, the travel assistance/automated driving control unit 29, the driver monitoring system (DMS) 30, the human machine interface (HMI) 31, and the vehicle control unit 32 are interconnected so that communication can be performed via a communication network 41. The communication network 41 is formed with an in-vehicle communication network, a bus, and the like that conform to a digital bidirectional communication standard such as the controller area network (CAN), local interconnect network (LIN), local area network (LAN), FlexRay (registered trademark), or Ethernet (registered trademark), for example. The communication network 41 may be selectively used depending on the type of data to be transmitted. For example, the CAN may be applied to data related to vehicle control, and the Ethernet may be applied to large-volume data. Note that, in some cases, the respective components of the vehicle control system 11 are connected directly to each other not via the communication network 41, but with the use of wireless communication intended for a relatively short-range communication, such as near field communication (NFC) or Bluetooth (registered trademark), for example.

Note that, hereinafter, in a case where each component of the vehicle control system 11 performs communication via the communication network 41, explanation of the communication network 41 will be omitted. For example, in a case where the vehicle control ECU 21 and the communication unit 22 perform communication via the communication network 41, it will be simply described as the vehicle control ECU 21 and the communication unit 22 performing communication.

For example, the vehicle control ECU 21 is formed with various processors such as a central processing unit (CPU) and a micro processing unit (MPU). The vehicle control ECU 21 controls all or some of the functions of the vehicle control system 11.

The communication unit 22 communicates with many kinds of devices inside and outside the vehicle, another vehicle, a server, a base station, and the like, and sends and receives various kinds of data. In doing so, the communication unit 22 can perform communication using a plurality of communication schemes.

Communication that can be performed by the communication unit 22 with the outside of the vehicle is now briefly described. The communication unit 22 communicates with a server (hereinafter referred to as an external server) or the like present on an external network via a base station or an access point by a wireless communication system such as fifth generation mobile communication system (5G), long term evolution (LTE), dedicated short range communications (DSRC), or the like, for example. The external network with which the communication unit 22 performs communication include the Internet, a cloud network, a provider-specific network, or the like, for example. The communication scheme by which the communication unit 22 communicates with the external network is not limited to any particular method, as long as it is a wireless communication scheme that enables digital bidirectional communication at a communication speed equal to or higher than a predetermined speed and over a distance equal to or longer than a predetermined distance.

Also, the communication unit 22 can communicate with a terminal present in the vicinity of the host vehicle, using a peer to peer (P2P) technology, for example. The terminal present in the vicinity of the host vehicle is a terminal attached to a mobile object moving at a relatively low speed such as a pedestrian or a bicycle, a terminal stationarily installed in a store or the like, or a machine type communication (MTC) terminal, for example. Further, the communication unit 22 can also perform V2X communication. V2X communication refers to communication between the host vehicle and others, such as vehicle to vehicle communication with another vehicle, vehicle to infrastructure communication with a roadside device or the like, vehicle to home communication, and vehicle to pedestrian communication with a terminal or the like carried by a pedestrian, for example.

The communication unit 22 can receive a program for updating software that controls operations of the vehicle control system 11 from the outside (Over The Air), for example. The communication unit 22 can further receive map information, traffic information, information regarding the surroundings of the vehicle 1, and the like from the outside. Also, the communication unit 22 can send information regarding the vehicle 1, information about the surroundings of the vehicle 1, and the like to the outside, for example. The information regarding the vehicle 1 to be sent to the outside by the communication unit 22 is data indicating a state of the vehicle 1, a recognition result from a recognition unit 73, or the like, for example. Further, the communication unit 22 performs communication compatible with a vehicle emergency call system such as eCall, for example.

The communication unit 22 receives an electromagnetic wave sent by the vehicle information and communication system (VICS) (registered trademark) with a radio wave beacon, an optical beacon, frequency modulation (FM) multiplex broadcasting, or the like, for example.

Communication that can be performed by the communication unit 22 with the inside of the vehicle is now briefly described. The communication unit 22 can communicate with each device in the vehicle, using wireless communication, for example. The communication unit 22 can perform wireless communication with a device in the vehicle by a communication scheme allowing digital bidirectional communication at a communication speed equal to or higher than a predetermined speed by wireless communication, such as wireless LAN, Bluetooth, NFC, or wireless universal serial bus (WUSB), for example. Besides this, the communication unit 22 can also communicate with each device in the vehicle, using wired communication. For example, the communication unit 22 can communicate with each device in the vehicle by wired communication via a cable connected to a connecting terminal not shown in the drawing. The communication unit 22 can communicate with each device in the vehicle by a communication scheme allowing digital bidirectional communication at a communication speed equal to or higher than a predetermined speed by wired communication, such as universal serial bus (USB), high-definition multimedia interface (HDMI) (registered trademark), or mobile high-definition link (MHL), for example.

Here, a device in the vehicle refers to a device that is not connected to the communication network 41 in the vehicle, for example. Possible examples of devices in the vehicle include a mobile device or a wearable device carried by an occupant such as a driver, an information device brought into the vehicle and temporarily installed, and the like.

The map information accumulation unit 23 accumulates either or both of a map acquired from the outside and a map created by the vehicle 1. For example, the map information accumulation unit 23 accumulates a three-dimensional high-precision map, a global map having a lower precision than the precision of the high-precision map but covering a wider area, and the like.

The high-precision map is a dynamic map, a point cloud map, a vector map, or the like, for example. The dynamic map is a map formed with four layers of dynamic information, semi-dynamic information, semi-static information, and static information, and is provided to the vehicle 1 from the external server or the like, for example. The point cloud map is a map formed with a point cloud (point cloud data). The vector map is a map obtained by associating traffic information such as lanes and the positions of traffic lights, and the like with a point cloud map, and adapting the associated point cloud map to the advanced driver assistance system (ADAS) or autonomous driving (AD), for example.

The point cloud map and the vector map may be provided from the external server or the like, for example, or may be created by the vehicle 1 and accumulated in the map information accumulation unit 23 as a map for performing matching with a local map described later, on the basis of a sensing result from a camera 51, a radar 52, a light detection and ranging or laser imaging detection and ranging (LiDAR) 53, or the like. Alternatively, in a case where the high-precision map is provided from the external server or the like, for example, map data of several hundred meters square regarding a planned route on which the vehicle 1 is to travel from now on is acquired from the external server or the like to reduce the communication volume.

The positional information acquisition unit 24 receives a global navigation satellite system (GNSS) signal from a GNSS satellite, and acquires positional information about the vehicle 1. The acquired positional information is supplied to the travel assistance/automated driving control unit 29. Note that the positional information acquisition unit 24 is not necessarily a scheme using a GNSS signal, and may acquire positional information using a beacon, for example.

The external recognition sensor 25 includes various sensors used for recognizing a situation outside the vehicle 1, and supplies sensor data from each sensor to each unit of the vehicle control system 11. The type and number of sensors included in the external recognition sensor 25 are arbitrary.

For example, the external recognition sensor 25 includes the camera 51, the radar 52, the light detection and ranging or laser imaging detection and ranging (LiDAR) 53, and an ultrasonic sensor 54. Besides this, the external recognition sensor 25 may have a configuration including one or more kinds of sensors among the camera 51, the radar 52, the LiDAR 53, and the ultrasonic sensor 54. The numbers of the cameras 51, the radars 52, the LiDARs 53, and the ultrasonic sensors 54 are not limited to any particular numbers, as long as the numbers represent installable numbers of sensors for the vehicle 1. Further, the kinds of sensors included in the external recognition sensor 25 are not limited to this example, and the external recognition sensor 25 may include a sensor of some other type. An example of the sensing area of each sensor included in the external recognition sensor 25 will be described later.

Note that the imaging scheme of the camera 51 is not limited to any particular scheme. For example, cameras of various imaging schemes such as a time of flight (ToF) camera, a stereo camera, a monocular camera, and an infrared camera, which are of imaging schemes capable of distance measurement, can be used for the camera 51 as necessary. Besides this, the camera 51 may be for simply acquiring a captured image without performing distance measurement.

Also, the external recognition sensor 25 can include an environmental sensor for detecting an environment of the vehicle 1, for example. The environmental sensor is a sensor for detecting an environment such as weather, climate, and brightness, and can include various sensors such as a raindrop sensor, a fog sensor, a sunshine sensor, a snow sensor, and an illuminance sensor, for example.

Moreover, for example, the external recognition sensor 25 includes a microphone used for detecting a sound around the vehicle 1, a position of a sound source, and the like.

The in-vehicle sensor 26 includes various kinds of sensors for detecting information about the inside of the vehicle, and supplies sensor data from each sensor to each component of the vehicle control system 11. The types and the number of the various sensors included in the in-vehicle sensor 26 are not limited to any particular types and number, as long as the types and the number represent realistically installable types and number for the vehicle 1.

For example, the in-vehicle sensor 26 can include one or more types of sensors among a camera, a radar, a seating sensor, a steering wheel sensor, a microphone, and a biometric sensor. As the cameras included in the in-vehicle sensor 26, for example, cameras of various imaging schemes capable of measuring a distance, such as a ToF camera, a stereo camera, a monocular camera, and an infrared camera, can be used. In addition to these cameras, a camera included in the in-vehicle sensor 26 may be a camera that simply acquires a captured image, without performing distance measurement. The biometric sensor included in the in-vehicle sensor 26 is disposed on a seat, a steering wheel, or the like, for example, and detects various kinds of biological information about an occupant such as the driver.

The vehicle sensor 27 includes various sensors for detecting a state of the vehicle 1, and supplies sensor data from each sensor to each component of the vehicle control system 11. The types and the number of the various sensors included in the vehicle sensor 27 are not limited to any particular kinds and number, as long as the types and the number represent realistically installable types and number for the vehicle 1.

For example, the vehicle sensor 27 includes a speed sensor, an acceleration sensor, an angular velocity sensor (gyroscopic sensor), and an inertial measurement unit (IMU) obtained by integrating these sensors. For example, the vehicle sensor 27 includes a steering angle sensor that detects a steering angle of the steering wheel, a yaw rate sensor, an accelerator sensor that detects an operation amount of the accelerator pedal, and a brake sensor that detects an operation amount of the brake pedal. For example, the vehicle sensor 27 includes a rotation sensor that detects the number of rotations of the engine or the motor, an air pressure sensor that detects an air pressure of a tire, a slip rate sensor that detects a slip rate of the tire, and a wheel speed sensor that detects a rotation speed of a wheel. For example, the vehicle sensor 27 includes a battery sensor that detects a state of charge and temperature of the battery, and an impact sensor that detects an external impact.

The storage unit 28 includes at least either a nonvolatile storage medium or a volatile storage medium, and stores data and programs. The storage unit 28 is used as, for example, an electrically erasable programmable read only memory (EEPROM) and a random access memory (RAM), and a magnetic storage device such as a hard disc drive (HDD), a semiconductor storage device, an optical storage device, and a magneto-optical storage device can be used as a storage medium. The storage unit 28 stores various kinds of programs and data to be used by the respective components of the vehicle control system 11. For example, the storage unit 28 includes an event data recorder (EDR) and a data storage system for automated driving (DSSAD), and stores information about the vehicle 1 before and after an event such as an accident, and information acquired by the in-vehicle sensor 26.

The travel assistance/automated driving control unit 29 controls travel assistance and automated driving of the vehicle 1. For example, the travel assistance/automated driving control unit 29 includes an analysis unit 61, an action planning unit 62, and an operation control unit 63.

The analysis unit 61 performs analysis processing of a situation of the vehicle 1 and the surroundings. The analysis unit 61 includes a self-position estimation unit 71, a sensor fusion unit 72, and the recognition unit 73.

The self-position estimation unit 71 estimates a self-position of the vehicle 1 on the basis of sensor data from the external recognition sensor 25 and a high-precision map accumulated in the map information accumulation unit 23. For example, the self-position estimation unit 71 generates a local map on the basis of sensor data from the external recognition sensor 25, and performs matching between the local map and the high-precision map, to estimate the self-position of the vehicle 1. The position of the vehicle 1 is based on, for example, the center of a rear wheel pair axle.

The local map is, for example, a three-dimensional high-precision map created using a technique such as simultaneous localization and mapping (SLAM) and the like, an occupancy grid map, and the like. The three-dimensional high-precision map is the above-described point cloud map or the like, for example. The occupancy grid map is a map in which a three-dimensional or two-dimensional space around the vehicle 1 is divided into grids (lattices) of a predetermined size, and an occupancy state of an object is indicated in units of grids. The occupancy state of the object is indicated by the presence/absence or existence probability of the object, for example. The local map is also used for detection processing and recognition processing of a situation outside the vehicle 1 by the recognition unit 73, for example.

Note that the self-position estimation unit 71 may estimate the self-position of the vehicle 1, on the basis of the positional information acquired by the positional information acquisition unit 24 and the sensor data from the vehicle sensor 27.

The sensor fusion unit 72 performs sensor fusion processing of combining a plurality of different types of sensor data (for example, image data supplied from the camera 51 and sensor data supplied from the radar 52) to obtain new information. Methods for combining different types of sensor data include integration, fusion, association, and the like.

The recognition unit 73 performs a detection process to detect a situation outside the vehicle 1, and a recognition process to recognize the situation outside the vehicle 1.

For example, the recognition unit 73 performs detection processing and recognition processing of the situation outside the vehicle 1 on the basis of information from the external recognition sensor 25, information from the self-position estimation unit 71, information from the sensor fusion unit 72, and the like.

Specifically, for example, the recognition unit 73 performs detection processing, recognition processing, and the like of an object around the vehicle 1. An object detection process is a process of detecting the presence/absence, size, shape, position, motion, and the like of an object, for example. An object recognition process is a process of recognizing an attribute such as the type of an object, or identifying a specific object, for example. However, the detection processing and the recognition processing are not necessarily clearly divided, and there is a case where the processing overlaps.

For example, the recognition unit 73 performs clustering to classify point clouds based on sensor data from the radar 52, the LiDAR 53, or the like into clusters of point clouds, to detect objects present around the vehicle 1. In this manner, the presence/absence, size, shape, and position of an object around the vehicle 1 are detected.

For example, the recognition unit 73 detects a motion of the object around the vehicle 1 by performing tracking that follows a motion of the cluster of point clouds classified by clustering. Therefore, a speed and a traveling direction (movement vector) of the object around the vehicle 1 are detected.

For example, the recognition unit 73 detects or recognizes a vehicle, a person, a bicycle, an obstacle, a structure, a road, a traffic light, a traffic sign, a road sign, and the like, on the basis of image data supplied from the camera 51. Also, the recognition unit 73 may recognize the type of an object present around the vehicle 1 by performing a recognition process such as semantic segmentation.

For example, the recognition unit 73 can perform a recognition process to recognize traffic rules around the vehicle 1, on the basis of the map accumulated in the map information accumulation unit 23, a result of self-position estimation performed by the self-position estimation unit 71, and a result of an object recognition performed by the recognition unit 73 to recognize objects present around the vehicle 1. Through this process, the recognition unit 73 can recognize the positions and the states of traffic lights, the contents of traffic signs and road signs, the contents of the traffic regulations, the driving-allowed lanes, and the like.

For example, the recognition unit 73 can perform a recognition process to recognize the surrounding environment of the vehicle 1. The surrounding environment to be recognized by the recognition unit 73 may include weather, air temperature, humidity, brightness, road surface conditions, and the like.

The action planning unit 62 creates an action plan for the vehicle 1. For example, the action planning unit 62 creates an action plan by performing a path planning and path following process.

Note that, global path planning is a process for roughly planning a path from a start to a goal. This path planning includes a process of performing path generation (local path planning) called a path planning that enables safe and smooth traveling in the vicinity of the vehicle 1, with the motion characteristics of the vehicle 1 being taken into consideration in the planned path.

The path following is a process of planning an operation for safely and accurately traveling along a path planned by the path planning within a planned time. For example, the action planning unit 62 can calculate the target speed and the target angular velocity of the vehicle 1, on the basis of a result of the path following process.

The operation control unit 63 controls operations of the vehicle 1 to achieve the action plan created by the action planning unit 62.

For example, the operation control unit 63 controls a steering control unit 81, a brake control unit 82, and a drive control unit 83 included in the vehicle control unit 32 described later, and performs acceleration and deceleration control and direction control so that the vehicle 1 follows the path calculated by the local path planning. For example, the operation control unit 63 performs coordinated control to achieve ADAS functions such as collision avoidance or impact mitigation, follow-up running, vehicle-speed maintaining running, warning of collision of the host vehicle, warning of lane departure of the host vehicle, and the like. For example, the operation control unit 63 performs coordinated control to perform automated driving or the like in which the vehicle autonomously runs without depending on the operation by a driver.

The DMS 30 performs an authentication process on the driver, a recognition process on a state of the driver, and the like, on the basis of sensor data from the in-vehicle sensor 26, data input to the HMI 31 described later, and the like. The state of the driver to be recognized may be a physical condition, an alertness level, a concentration level, a fatigue level, a line-of-sight direction, a drunkenness level, a driving operation, a posture, or the like, for example.

Note that the DMS 30 may perform an authentication process on an occupant other than the driver, and a recognition process to recognize the state of the occupant. Furthermore, the DMS 30 may perform a recognition process to recognize the conditions inside the vehicle, on the basis of sensor data from the in-vehicle sensor 26, for example. The conditions inside the vehicle to be recognized may be temperature, humidity, brightness, odor, and the like, for example.

The HMI 31 receives inputs of various kinds of data, instructions, and the like, and presents various kinds of data to the driver and the like.

An input of data through the HMI 31 is now roughly described. The HMI 31 includes an input device for a person to input data. The HMI 31 generates an input signal on the basis of data, an instruction, or the like that has been input through the input device, and supplies the input signal to each component of the vehicle control system 11. The HMI 31 includes an operation element such as a touch panel, a button, a switch, and a lever as the input device, for example. In addition to this, the HMI 31 may further include an input device capable of inputting information by a method such as voice, gesture, or the like that is not a manual operation. Moreover, the HMI 31 may use a remote control device using infrared rays or radio waves, for example, or an external connection device such as a mobile device or a wearable device as an input device compatible with operations of the vehicle control system 11.

Presentation of data by the HMI 31 is now roughly described. The HMI 31 generates visual information, audio information, and haptic information regarding an occupant or the outside of a vehicle. Also, the HMI 31 performs output control to control outputting, output contents, an output timing, an output method, and the like of each piece of the generated information. The HMI 31 generates and outputs, as the visual information, information indicated by images or light of an operation screen, a display of the state of the vehicle 1, a warning display, a monitor image indicating a situation around the vehicle 1, and the like, for example. Also, the HMI 31 generates and outputs, as the audio information, information indicated by sounds, such as voice guidance, a warning sound, and a warning message, for example. Further, the HMI 31 generates and outputs, as the haptic information, information to be given to the tactile sense of an occupant by force, vibration, motion, or the like, for example.

As the output device through which the HMI 31 outputs the visual information, a display device that presents the visual information by displaying an image, or a projector device that presents the visual information by projecting an image can be used, for example. Note that, other than a display device having a conventional display, the display device may be a device that displays the visual information in the field of view of an occupant, such as a head-up display, a transmissive display, or a wearable device having an augmented reality (AR) function, for example. Furthermore, in the HMI 31, a display device included in a navigation device, an instrument panel, a camera monitoring system (CMS), an electronic mirror, a lamp, or the like provided in the vehicle 1 can also be used as the output device that outputs the visual information.

As the output device through which the HMI 31 outputs the audio information, an audio speaker, headphones, or earphones can be used, for example.

As the output device through which the HMI 31 outputs the haptic information, a haptic element using a haptic technology can be used, for example. The haptic element is disposed at a portion to be touched by an occupant of the vehicle 1, such as the steering wheel or a seat, for example.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 performs detection, control, and the like of a state of a steering system of the vehicle 1. The steering system includes a steering mechanism including the steering wheel and the like, an electric power steering, and the like, for example. The steering control unit 81 includes a steering ECU that controls the steering system, an actuator that drives the steering system, and the like, for example.

The brake control unit 82 performs detection, control, and the like of a state of the brake system of the vehicle 1. The brake system includes a brake mechanism including a brake pedal and the like, an antilock brake system (ABS), a regenerative brake mechanism, and the like, for example. The brake control unit 82 includes a brake ECU that controls the brake system, an actuator that drives the brake system, and the like, for example.

The drive control unit 83 performs detection, control, and the like of a state of a drive system of the vehicle 1. The drive system includes an accelerator pedal, a driving force generation device for generating a driving force, such as an internal combustion engine or a driving motor, a driving force transmission mechanism for transmitting the driving force to the wheels, and the like, for example. The drive control unit 83 includes a drive ECU that controls the drive system, an actuator that drives the drive system, and the like, for example.

The body system control unit 84 performs detection, control, and the like of a state of a body system of the vehicle 1. The body system includes a keyless entry system, a smart key system, a power window device, a power seat, an air conditioner, an airbag, a seat belt, a shift lever, and the like, for example. The body system control unit 84 includes a body system ECU that controls the body system, an actuator that drives the body system, and the like, for example.

The light control unit 85 performs detection, control, and the like of states of various lights of the vehicle 1. The lights to be controlled may be the headlight, the backing light, a fog light, a turn signal, a brake light, a projection, a bumper display, and the like are assumed, for example. The light control unit 85 includes a light ECU that controls the lights, an actuator that drives the lights, and the like.

The horn control unit 86 performs detection, control, and the like of a state of the car horn of the vehicle 1. The horn control unit 86 includes a horn ECU that controls the car horn, an actuator that drives the car horn, and the like, for example.

Figure 2:
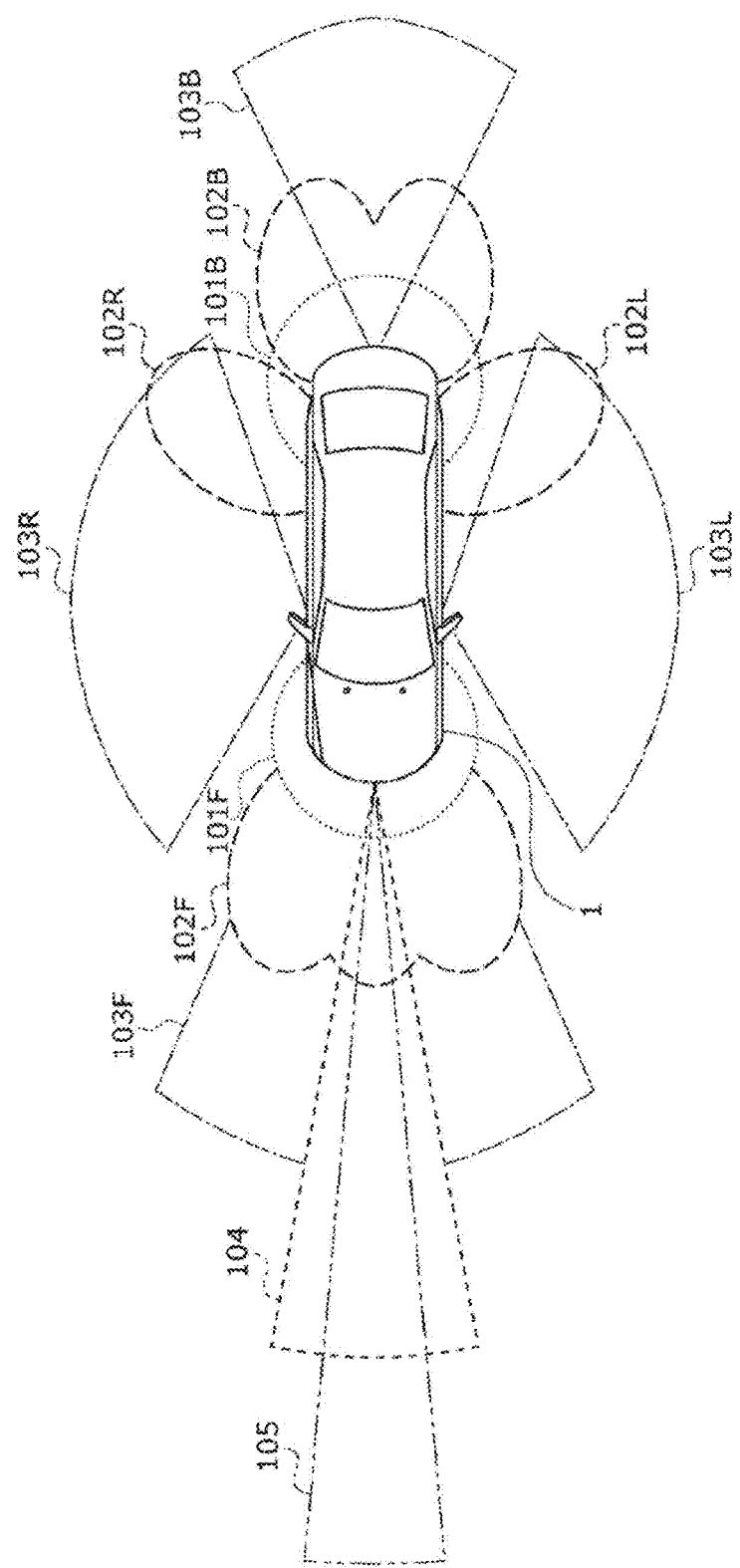
FIG. 2 is a view illustrating an example of a sensing area.

FIG. 2 is a diagram illustrating examples of sensing areas of the camera 51, the radar 52, the LiDAR 53, the ultrasonic sensor 54, and the like of the external recognition sensor 25 in FIG. 1. Note that FIG. 2 schematically illustrates the vehicle 1 as viewed from above, in which the left end side is the front end (front) side of the vehicle 1, and the right end side is the rear end (rear) side of the vehicle 1.

A sensing area 101F and a sensing area 101B indicate examples of the sensing area of the ultrasonic sensors 54. The sensing area 101F covers an area around the front end of the vehicle 1 with a plurality of the ultrasonic sensors 54. The sensing area 101B covers an area around the rear end of the vehicle 1 with a plurality of the ultrasonic sensors 54.

Sensing results in the sensing area 101F and the sensing area 101B are used, for example, for parking assistance and the like of the vehicle 1.

Sensing areas 102F to 102B illustrate examples of sensing areas by the radar 52 for a short distance or a middle distance. The sensing area 102F covers an area extending to a position farther than the sensing area 101F in front of the vehicle 1. The sensing area 102B covers an area extending to a position farther than the sensing area 101B behind the vehicle 1. The sensing area 102L covers an area around the rear left side of the vehicle 1. A sensing area 102R covers the rear periphery of a right side surface of the vehicle 1.

A sensing result in the sensing area 102F is used, for example, for detection and the like of a vehicle, a pedestrian, and the like existing in front of the vehicle 1. A sensing result in the sensing area 102B is used in a collision prevention function and the like behind the vehicle 1, for example. Sensing results in the sensing area 102L and the sensing area 102R are used, for example, for detection and the like of an object in a blind spot on the side of the vehicle 1.

Sensing areas 103F to 103B illustrate examples of sensing areas by the camera 51. The sensing area 103F covers an area extending to a position farther than the sensing area 102F in front of the vehicle 1. The sensing area 103B covers an area extending to a position farther than the sensing area 102B behind the vehicle 1. The sensing area 103L covers an area around the left side of the vehicle 1. A sensing area 103R covers the periphery of the right side surface of the vehicle 1.

A sensing result in the sensing area 103F can be used in recognition of a traffic light or a traffic sign, a lane departure prevention assist system, and an automatic headlight control system, for example. A sensing result in the sensing area 103B can be used in parking assistance, a surround view system, and the like, for example. Sensing results in the sensing area 103L and the sensing area 103R can be used in a surround view system, for example.

A sensing area 104 illustrates an example of a sensing area by the LiDAR 53. The sensing area 104 covers an area extending to a position farther than the sensing area 103F in front of the vehicle 1. Meanwhile, the sensing area 104 has a narrower range in a left-right direction than the sensing area 103F.

A sensing result in the sensing area 104 is used in detection of an object such as a vehicle in the vicinity, for example.

A sensing area 105 illustrates an example of a sensing area by the radar 52 for a long distance. The sensing area 105 covers an area extending to a position farther than the sensing area 104 in front of the vehicle 1. Meanwhile, the sensing area 105 has a narrower range in the left-right direction than the sensing area 104.

A result of sensing in the sensing area 105 is used in adaptive cruise control (ACC), emergency braking, collision avoidance, and the like, for example.

Note that the sensing areas of the respective sensors, which are the cameras 51, the radars 52, the LiDAR 53, and the ultrasonic sensors 54 included in the external recognition sensor 25, may have various configurations other than those illustrated in FIG. 2. Specifically, the ultrasonic sensors 54 may also perform sensing on the sides of the vehicle 1, or the LiDAR 53 may perform sensing behind the vehicle 1. Also, the installation position of each sensor is not limited to each corresponding example described above. Furthermore, the number of sensors of each kind may be one or larger.

2. Embodiment

Next, an embodiment of the present technology is described with reference to FIGS. 3, 4, 5, 6, 7, 8, 9, 10, 11, 12, 13, 14, 15, 16, 17, 18, 19, 20, 21, 22A, 22B, 23, 24, and 25.

<Example Configuration of the Exterior of the Vehicle 1>

First, an example configuration of the exterior of the vehicle 1 is described with reference to FIGS. 3 to 13.

First, the configuration of the exterior illumination system of the vehicle 1 is mainly described with reference to FIGS. 3 to 10.

Figure 3:
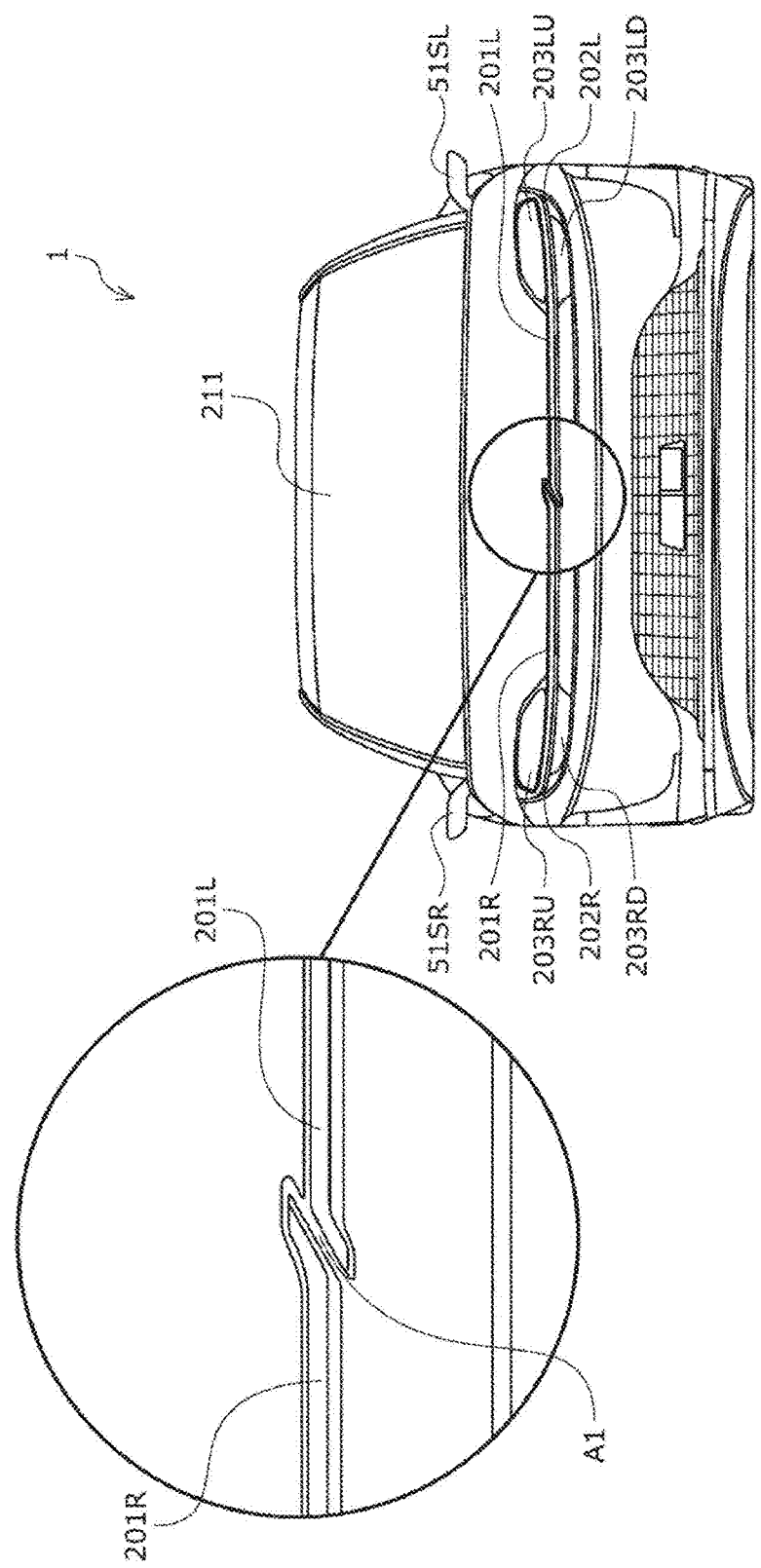
FIG. 3 is a front view of a vehicle and an enlarged view of the vicinity of a logo.
Figure 4:
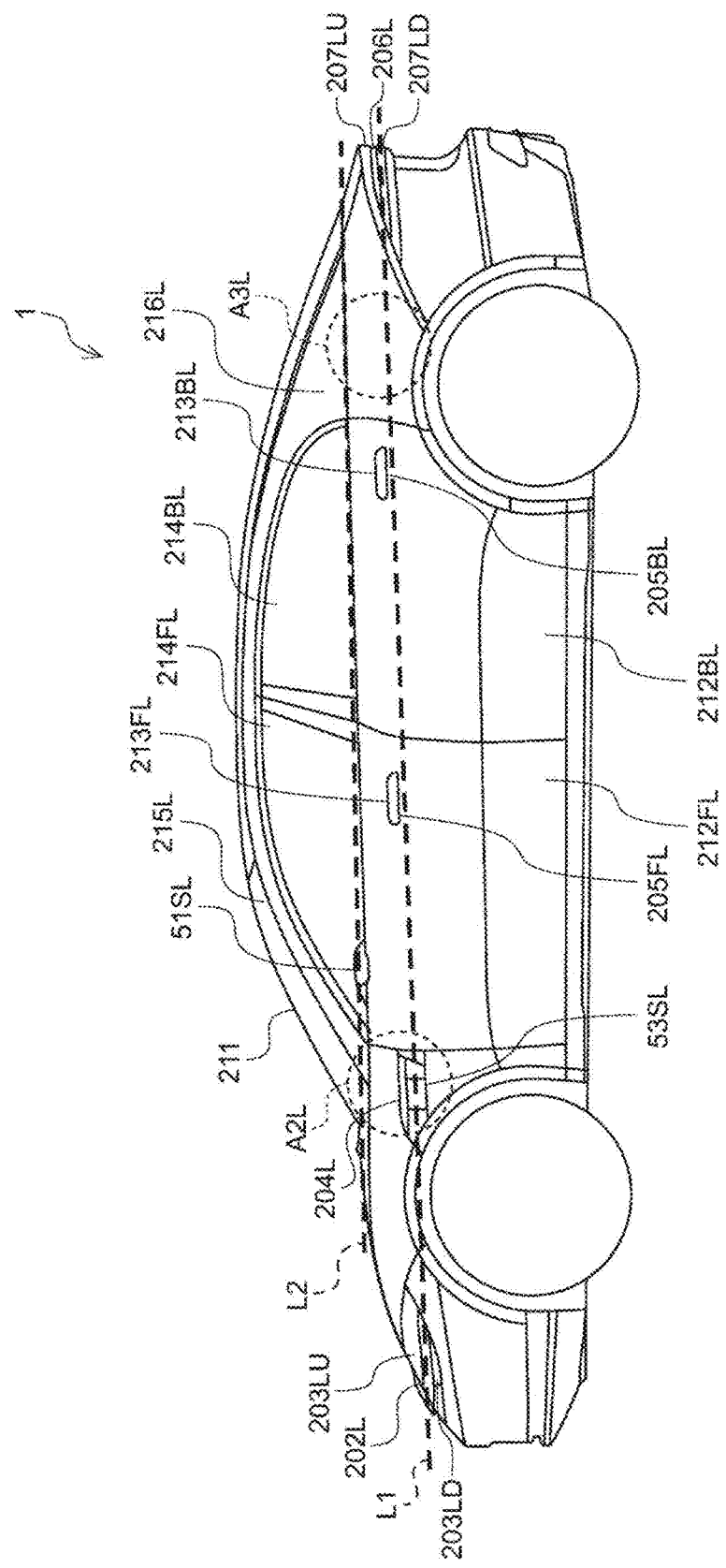
FIG. 4 is a left side view of the vehicle.
Figure 5:
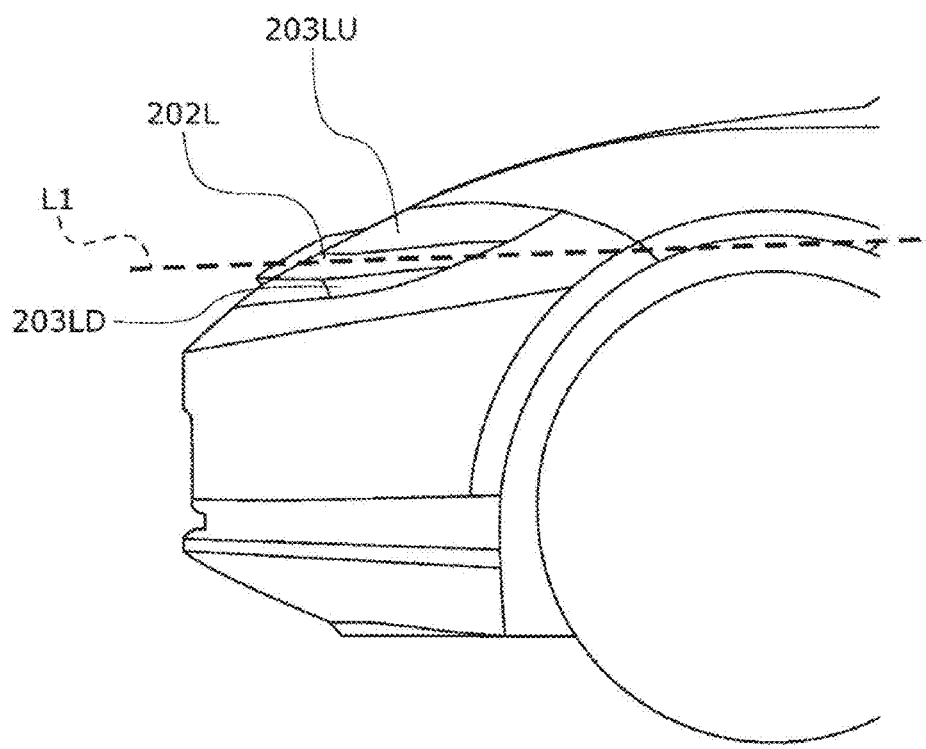
FIG. 5 is an enlarged view of the front end portion of the left side surface of the vehicle.
Figure 6:
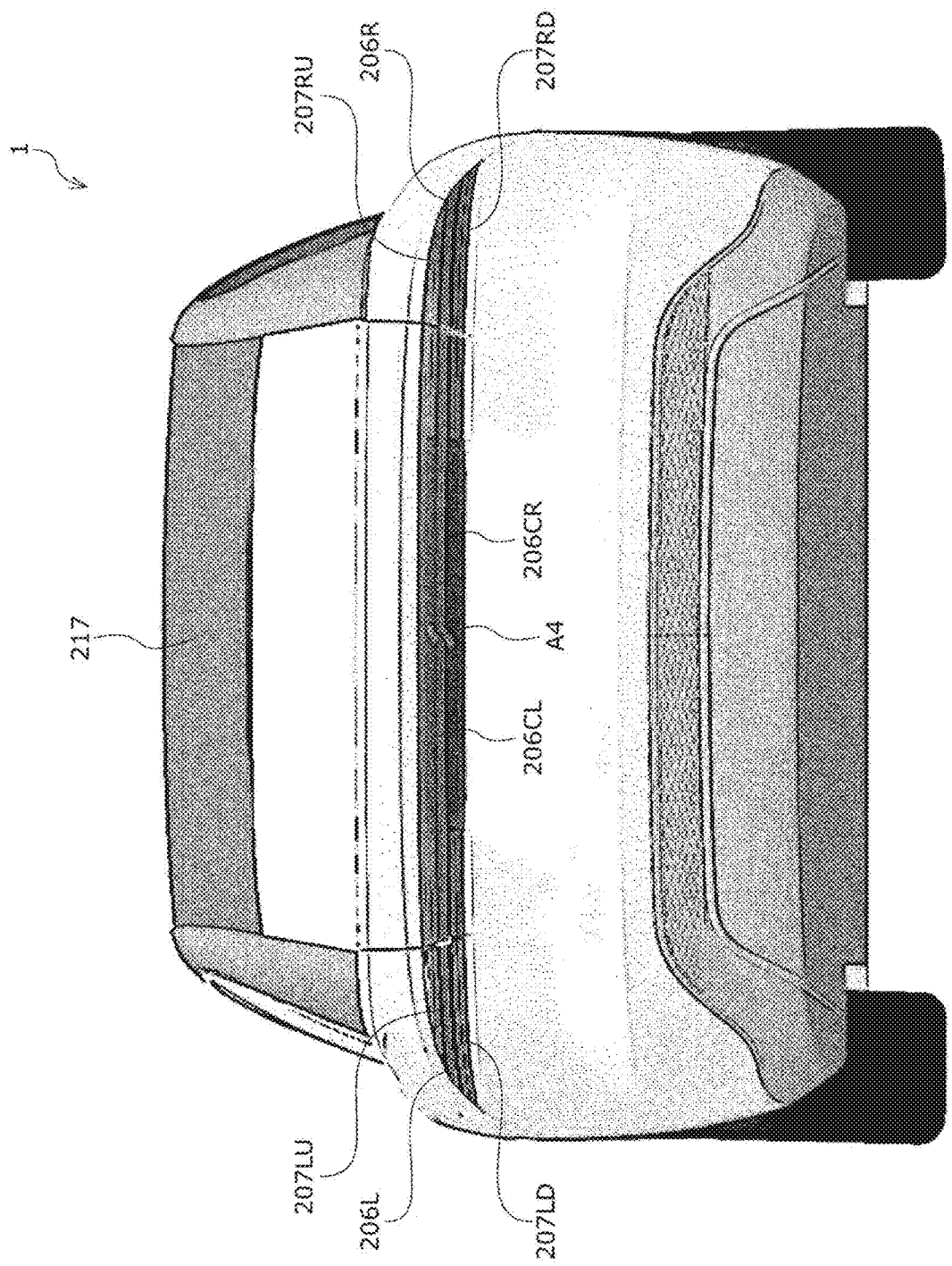
FIG. 6 is a rear view of the vehicle.
Figure 7:
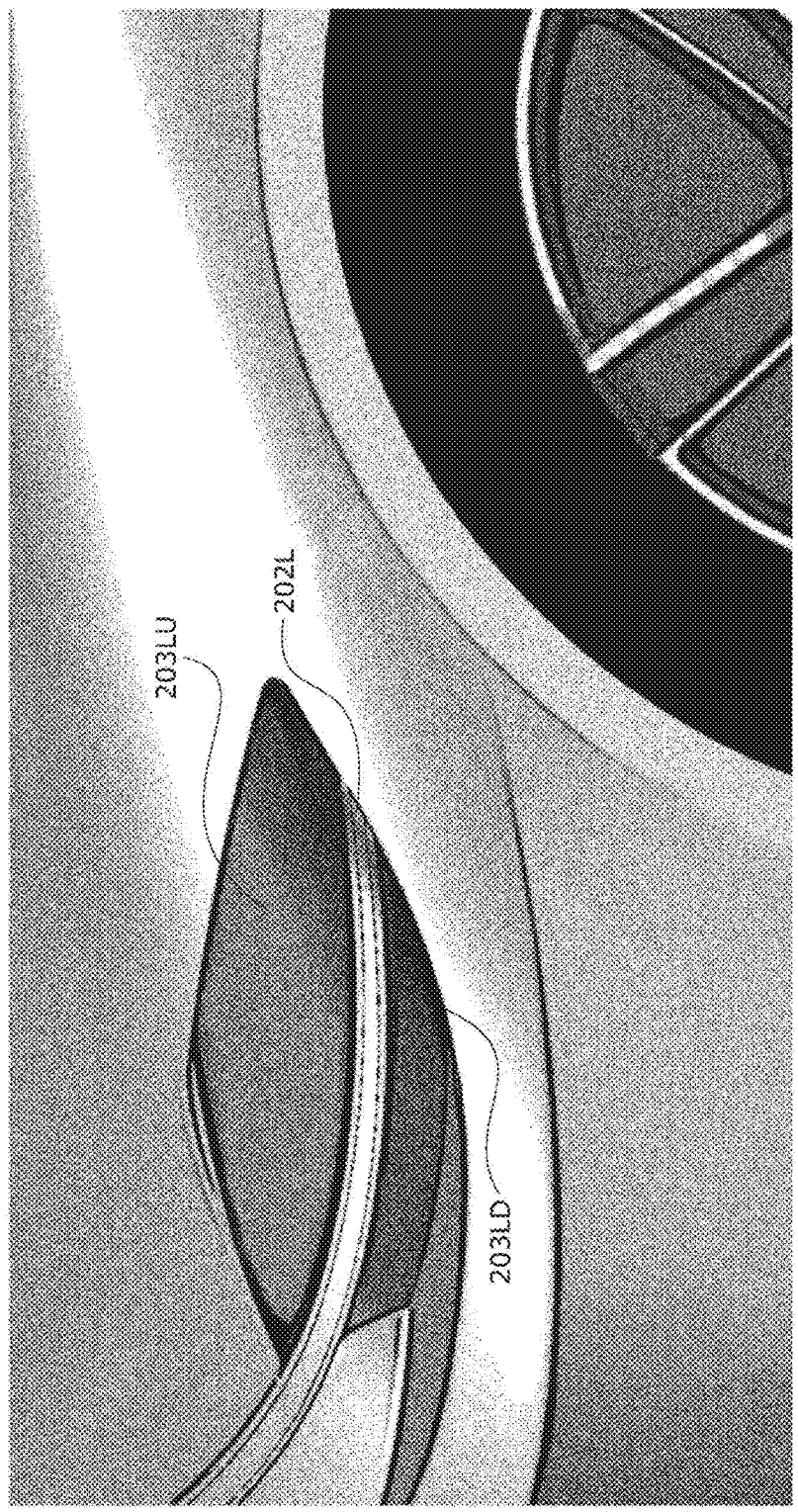
FIG. 7 is a view of the vicinity of the headlight on the left side of the vehicle.
Figure 8:
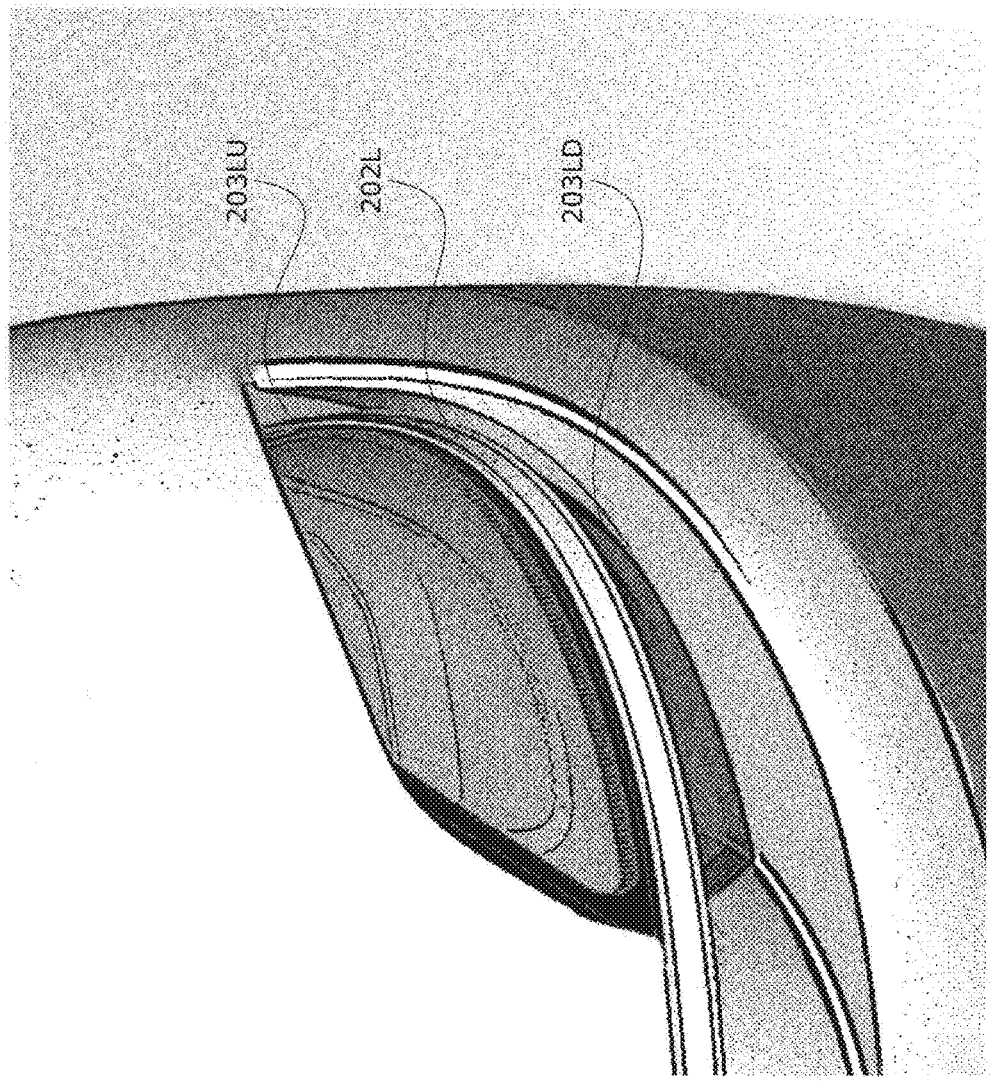
FIG. 8 is a view of the vicinity of the headlight on the left side of the vehicle.
Figure 9:
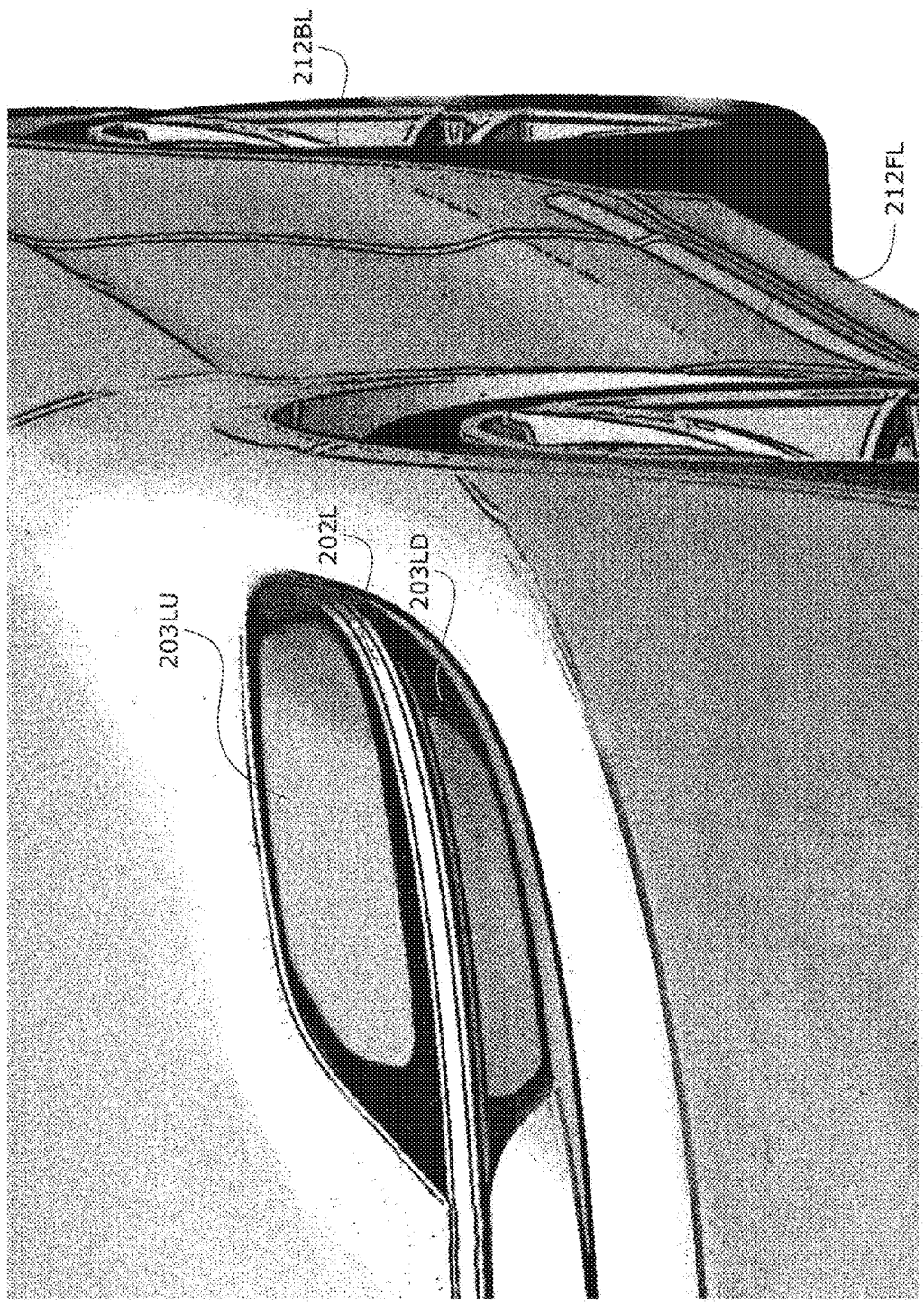
FIG. 9 is a view of the vicinity of the headlight on the left side of the vehicle.
Figure 10:
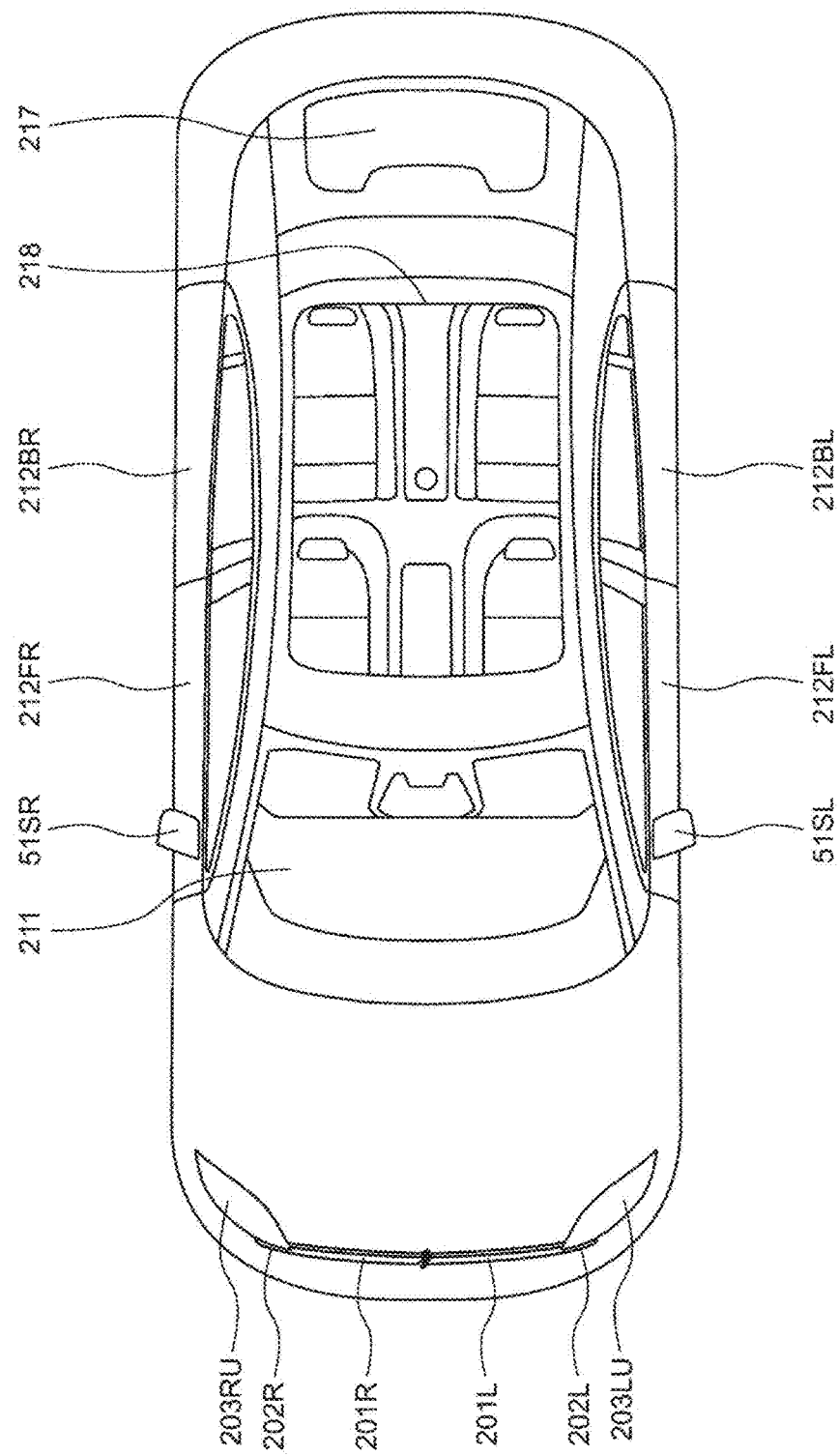
FIG. 10 is a plan view of the vehicle.

FIG. 3 is a front view of the vehicle 1 and an enlarged view of the vicinity of the logo of the vehicle 1 at the center of the front face. FIG. 4 is a left side view of the vehicle 1. FIG. 5 is an enlarged view of the front end portion of the left side surface of the vehicle 1. FIG. 6 is a rear view of the vehicle 1. FIGS. 7 to 9 are views of the vicinity of the headlight on the left side of the vehicle 1 as viewed from a plurality of directions. FIG. 10 is a plan view of the vehicle 1.

Note that, in the description below, the left side and the right side when facing the traveling direction of the vehicle 1 will be referred to as the left side and the right side of the vehicle 1, respectively. For example, the left side and the right side in FIG. 3 are the right side and the left side of the vehicle 1, respectively.

Many of lights and sensors outside the vehicle 1 are disposed along a loop line L1, which is a virtual line surrounding the periphery of the body of the vehicle 1 in a substantially horizontal direction. Here, "being disposed along the loop line L1" includes not only the case of being disposed on the loop line L1 but also the case of being disposed in the vicinity of the loop line L1.

For example, as illustrated in FIG. 3, an accessory light 201L, an accessory light 201R, a day running light 202L, a day running light 202R, a headlight 203LU, a headlight 203LD, a headlight 203RU, and a headlight 203RD are disposed on the front face of the body.

The accessory light 201L extends in the vehicle width direction (lateral direction) from the center of the front face of the body to the vicinities of the right ends of the headlight 203LU and the headlight 203LD. The accessory light 201R extends in the vehicle width direction (lateral direction) from the center of the front face of the body to the vicinities of the left ends of the headlight 203RU and the headlight 203RD.

The accessory light 201L and the accessory light 201R are separated from each other, and a gap is formed in between. Specifically, the right end portion of the accessory light 201L is bent diagonally downward to the right, and the left end portion of the accessory light 201R is bent diagonally upward to the left. The bent portion at the right end of the accessory light 201L and the bent portion at the left end of the accessory light 201R face each other substantially in parallel with a predetermined gap left in between, to form the logo of the vehicle 1. An optical sensor (not shown) such as a camera, a radar, or a LiDAR, for example, is disposed in an area A1 of the gap between the accessory light 201L and the accessory light 201R, near the center of the logo.

The day running light 202L extends in the horizontal direction from the left end of the accessory light 201L to the vicinities of the left ends of the headlight 203LU and the headlight 203LD. Further, as illustrated in FIGS. 7 to 9, the left end portion of the day running light 202L is curved rearward of the vehicle 1, and extends in a direction penetrating the body.

The day running light 202R extends in the horizontal direction from the right end of the accessory light 201R to the vicinities of the right ends of the headlight 203RU and the headlight 203RD. Although not shown in the drawings, the right end portion of the day running light 202R is also curved rearward of the vehicle 1 and extends in a direction penetrating the body, like the day running light 202L.

The accessory light 201L, the accessory light 201R, the day running light 202L, and the day running light 202R constitute a front light along the loop line L1 on the front face of the body. Also, the front light forms a front line that is part of the loop line L1, extends in the vehicle width direction (lateral direction) on the front face of the body, is curved rearward at both end portions, and extends in a direction penetrating the body.

Each of the accessory light 201L, the accessory light 201R, the day running light 202L, and the day running light 202R includes a plurality of LEDs arranged in the horizontal direction. Switching on and off, color, brightness, and the like of each LED can be controlled individually.

Note that the accessory light 201L and the accessory light 201R will be hereinafter referred to simply as the accessory lights 201 in a case where there is no need to distinguish them from each other. The day running light 202L and the day running light 202R will be hereinafter referred to simply as the day running lights 202 in a case where there is no need to distinguish them from each other.

The headlight 203LU is adjacent to the upper side of the day running light 202L, extends in the horizontal direction, and is curved rearward at the left end portion. The headlight 203LD is adjacent to the lower side of the day running light 202L, extends in the horizontal direction, and is curved rearward at the left end portion. In this manner, the headlight 203LU and the headlight 203LD are divided vertically by the day running light 202L (the front line).

The headlight 203RU is adjacent to the upper side of the day running light 202R, extends in the horizontal direction, and is curved rearward at the right end portion. The headlight 203RD is adjacent to the lower side of the day running light 202R, extends in the horizontal direction, and is curved rearward at the right end portion. In this manner, the headlight 203RU and the headlight 203RD are divided vertically by the day running light 202R (the front line).

Each of the headlight 203LU and the headlight 203RU includes a plurality of LEDs arranged in the horizontal direction and the vertical direction, and outputs a low beam. Each of the headlight 203LD and the headlight 203RD includes a plurality of LEDs arranged in the horizontal direction and the vertical direction, and outputs a high beam. Switching on and off, color, brightness, and the like of each LED can be controlled individually.

Note that the headlight 203LU and the headlight 203LD will be hereinafter referred to simply as the headlights 203L in a case where there is no need to distinguish them from each other. The headlight 203RU and the headlight 203RD will be hereinafter referred to simply as the headlights 203R in a case where there is no need to distinguish them from each other. The headlights 203L and the headlights 203R will be hereinafter referred to simply as the headlights 203 in a case where there is no need to distinguish them from each other.

As the headlights 203L and the headlights 203R are divided vertically by the front line in this manner, the degree of freedom in the design of the headlights 203L and the headlights 203R becomes higher. For example, each of the headlights 203L and the headlights 203R can have a design other than the shape of a slanting eye or the shape of a down-slanting eye. Furthermore, low beams (the headlight 203LU and the headlight 203RU) and high beams (the headlight 203LD and the headlight 203RD) are disposed at appropriate positions, and thus, the functionality of the headlights 203 and the safety of the vehicle 1 are not degraded.

Further, as illustrated in FIG. 4, for example, a turn signal 204L, an auxiliary light 205FL, and an auxiliary light 205BL are disposed on the left side surface of the body.

The turn signal 204L extends in the longitudinal direction on an extension line of an A pillar 215L and immediately above the loop line L1.

The auxiliary light 205FL is disposed on a back side of a doorknob 213FL of a left front door 212FL, and illuminates the vicinity of the doorknob 213FL. Since the doorknob 213FL is disposed immediately above the loop line L1, the auxiliary light 205FL is also disposed immediately above the loop line L1.

Further, a short-range wireless communication device (not shown) such as NFC is disposed on the doorknob 213FL or near the doorknob 213FL, for example.

The auxiliary light 205BL is disposed on the back side of a doorknob 213BL of a left rear door 212BL, and illuminates the vicinity of the doorknob 213BL. Since the doorknob 213BL is disposed immediately above the loop line L1, the auxiliary light 205BL is also disposed immediately above the loop line L1.

Also, a short-range wireless communication device (not shown) such as NFC is disposed on the doorknob 213BL or near the doorknob 213BL, for example.

As described above, on the left side surface of the vehicle 1, the turn signal 204L, the auxiliary light 205FL, and the auxiliary light 205BL are arranged in the longitudinal direction along the loop line L1.

Each of the turn signal 204L, the auxiliary light 205FL, and the auxiliary light 205BL includes a plurality of LEDs arranged in the horizontal direction. Switching on and off, color, brightness, and the like of each LED can be controlled individually.

Furthermore, as illustrated in FIG. 4, an optical sensor such as a camera, a radar, or a LiDAR, for example, is provided in an area A2L near the intersection of a loop line L1 and the extension line of the A pillar 215L. For example, a LiDAR 53FL is disposed below the turn signal 204L and on the loop line L1.

Further, an optical sensor (not shown) such as a camera, a radar, or a LiDAR, for example, is provided in an area A3L near the intersection of the loop line L1 and an extension line of a C pillar 216L.

As an optical sensor is disposed in the vicinity of the loop line L1 in this manner, it is recognized that the optical sensor forms part of the loop line L1, even if the color of the surface of the optical sensor is different from the color of the vehicle body, for example. Thus, the optical sensor naturally blends into the exterior appearance of the body, without causing a feeling of strangeness.

Note that, although not shown in the drawings, on the right side surface of the vehicle 1, a turn signal 204R, an auxiliary light 205FR, an auxiliary light 205BR, a doorknob 213FR, a doorknob 213BR, a short-range wireless communication device, and an optical sensor are also disposed at positions, like those on the left side surface.

Further, as illustrated in FIG. 6, for example, a taillight 206CL, a taillight 206CR, a taillight 206L, a taillight 206R, a brake light 207LU, a brake light 207LD, a brake light 207RU, and a brake light 207RD are disposed on the rear face of the body.

The taillight 206CL extends in the vehicle width direction (lateral direction) from the center of the rear face of the body to the vicinities of the right ends of the brake light 207LU and the brake light 207LD. The taillight 206CR extends in the horizontal direction from the center of the rear face of the body to the vehicle width direction (near the right ends) of the brake light 207RU and the brake light 207RD.

The taillight 206CL and the taillight 206CR are separated from each other, and a gap is formed in between. Specifically, the right end portion of the taillight 206CL is bent diagonally upward to the right, and the left end portion of the taillight 206CR is bent diagonally downward to the left. The bent portion at the right end of the taillight 206CL and the bent portion at the left end of the taillight 206CR face each other substantially in parallel with a predetermined gap being kept in between, to form the logo of the vehicle 1. An optical sensor (not shown) such as a camera, a radar, or a LiDAR, for example, is disposed in an area A4 of a gap between the taillight 206CL and the taillight 206CR, near the center of the logo.

The taillight 206L extends in the horizontal direction from the left end of the taillight 206CL to the vicinities of the left ends of the brake light 207LU and the brake light 207LD. The left end portion of the taillight 206L is curved forward. The taillight 206R extends in the horizontal direction from the right end of the taillight 206CR to the vicinities of the right ends of the brake light 207RU and the brake light 207RD. The right end portion of the taillight 206R is curved forward.

The taillight 206CL, the taillight 206CR, the taillight 206L, and the taillight 206R constitute a tail line that extends in the lateral direction on the rear face of the body and has both end portions curved forward. The tail line forms part of the loop line L1.

Each of the taillight 206CL, the taillight 206CR, the taillight 206L, and the taillight 206R includes a plurality of LEDs arranged in the horizontal direction. Switching on and off, color, brightness, and the like of each LED can be controlled individually.

Note that the taillight 206CL and the taillight 206CR will be hereinafter referred to simply as the taillights 206C in a case where there is no need to distinguish them from each other. The taillights 206C, the taillight 206L, and the taillight 206R will be hereinafter referred to simply as the taillights 206 in a case where there is no need to distinguish them from one another.

The brake light 207LU is adjacent to the upper side of the taillight 206L, and is curved forward at the left end portion. The brake light 207LD is adjacent to the lower side of the taillight 206L, and is curved forward at the left end portion. In this manner, the brake light 207LU and the brake light 207LD are divided vertically by the taillight 206L.

The brake light 207RU is adjacent to the upper side of the taillight 206R, and is curved forward at the right end portion. The brake light 207RD is adjacent to the lower side of the taillight 206R, and is curved forward at the right end portion. In this manner, the brake light 207RU and the brake light 207RD are divided vertically by the taillight 206R (tail line).

Each of the brake light 207LU, the brake light 207LD, the brake light 207RU, and the brake light 207RD includes a plurality of LEDs arranged in the horizontal direction. Switching on and off, color, brightness, and the like of each LED can be controlled individually.

Note that the brake light 207LU and the brake light 207LD will be hereinafter referred to simply as the brake lights 207L, in a case where there is no need to distinguish them from each other. The brake light 207RU and the brake light 207RD will be hereinafter referred to simply as the brake lights 207R in a case where there is no need to distinguish them from each other. The brake lights 207L and the brake lights 207R will be hereinafter referred to simply as the brake lights 207 in a case where there is no need to distinguish them from each other.

Furthermore, with a loop line L2, which is a virtual line surrounding the periphery of the body of the vehicle 1 in a substantially horizontal direction, serving as a boundary, the color of the body varies along the lower end of a windshield 211, the lower end of a window 214FL of the door 212FL, the lower end of a window 214BL of the door 212BL, the lower end of a window 214FR (not shown) of a door 212FR, and the lower end of a window 214BR (not shown) of a door 212BR.

For example, along the loop line L2, a black line is formed by chrome plating. Further, the area above the loop line L2 is in the black color. For example, black coating is applied to the portion of the body above the loop line L2. Also, the windshield 211, the window 214FL, the window 214BL, the window 214FR, the window 214BR, and a rear window 217 are tinted with a blackish color.

Below the loop line L2, on the other hand, coating in a color different from the color applied above the loop line L2 is applied to the body. Note that the color of the lower body is not limited to any specific color.

Further, along the loop line L2 in the vicinities of the front ends and the lower ends of the window 214FL and the window 214FR (not shown), a camera 51SL and a camera 51SR are provided. Each of the camera 51SL and the camera 51SR captures an image of the scenery diagonally to the left or diagonally to the right behind the vehicle 1.

In the manner described above, it is possible to improve the designability while avoiding degradation in safety and functionality of the vehicle 1.

For example, in the exterior appearance of the vehicle 1, the two substantially parallel loop lines L1 and L2 are to be virtually recognized. This makes the vehicle body look lower, and can give a sporty impression.

Also, the degree of freedom in design of the headlights becomes higher, as described above. Further, since each light is disposed at an appropriate position, functionality of each light and safety of the vehicle 1 are not degraded.

Also, as the front line (the front light) is curved rearward at both ends and extends in a direction penetrating the body, the impression to be given is such that the front line penetrates the body and continues to the LiDAR 53FL on the left side surface and a LiDAR 53RL on the right side surface.

Further, as the sensors are disposed on the periphery of the vehicle 1 along the loop line L1, an impression of watching (monitoring) the surroundings of the vehicle 1 is given, and it is effective to prevent theft and destruction of the vehicle 1.

Furthermore, as illustrated in FIG. 10, the roof of the vehicle 1 has a roof window 218. For example, a material capable of changing transmittance using an electrochromic element or the like is used for the roof window 218, and the body system control unit 84 can control the transmittance of the roof window 218. Note that the body system control unit 84 may control the transmittance of the roof window 218 for each part, for example. As a result, it becomes possible to set different transmittances at the center portion and the peripheral portion of the roof window 218, for example.

Note that, in the description below, the accessory light 201L, the accessory light 201R, the day running light 202L, the day running light 202R, the headlight 203LU, the headlight 203LD, the headlight 203RU, the headlight 203RD, the turn signal 204L, the turn signal 204R, the auxiliary light 205FL, the auxiliary light 205FR, the auxiliary light 205BL, the auxiliary light 205BR, the taillight 206L, the taillight 206R, the taillight 206CL, the taillight 206CR, the brake light 207LU, the brake light 207LD, the brake light 207RU, and the brake light 207RD, which constitute the exterior illumination system of the vehicle 1, will be collectively referred to as the exterior lights.

Also, the door 212FL, the door 212FR, the door 212BL, and the door 212BR will be hereinafter referred to simply as the doors 212 in a case where there is no need to distinguish them from one another.

Figure 12:
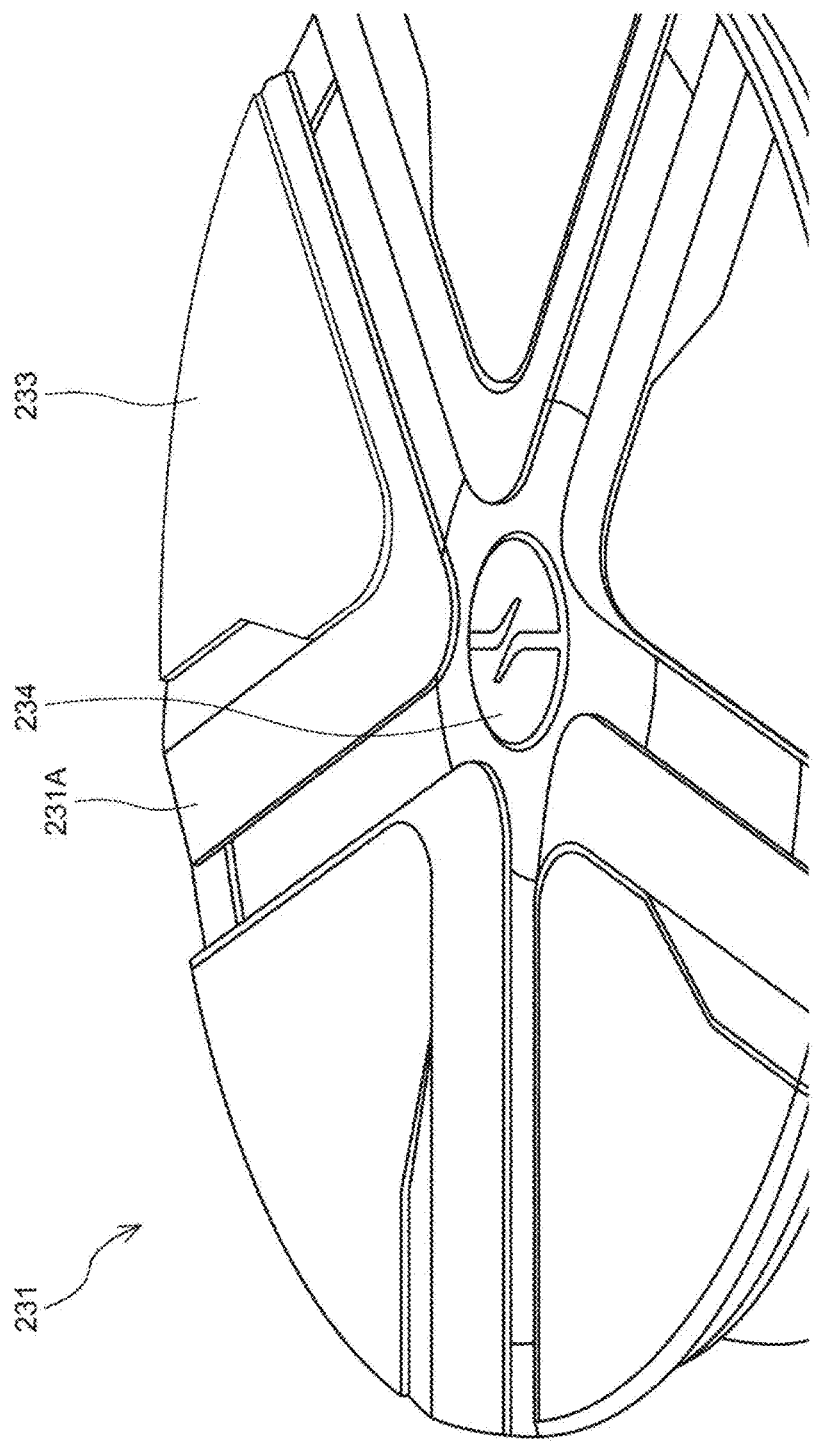
FIG. 12 is a schematic view illustrating part of the example configuration of the wheel, with the wheel caps being attached thereto.
Figure 13:
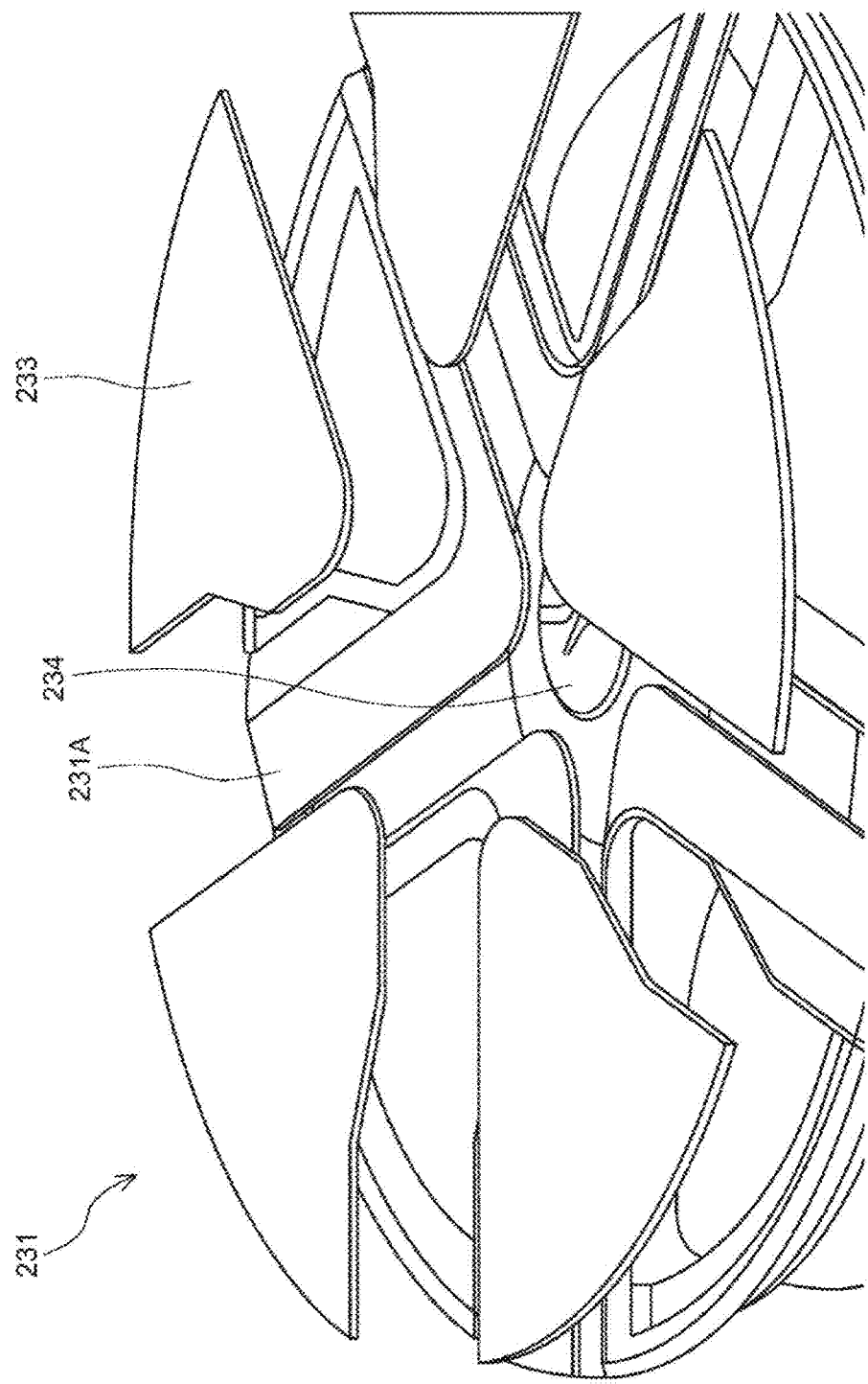
FIG. 13 is a schematic view illustrating part of the example configuration of the wheel, with the wheel caps being removed.

Next, an example configuration of a wheel 231 of the vehicle 1 is described with reference to FIGS. 11 to 13.

Figure 11:
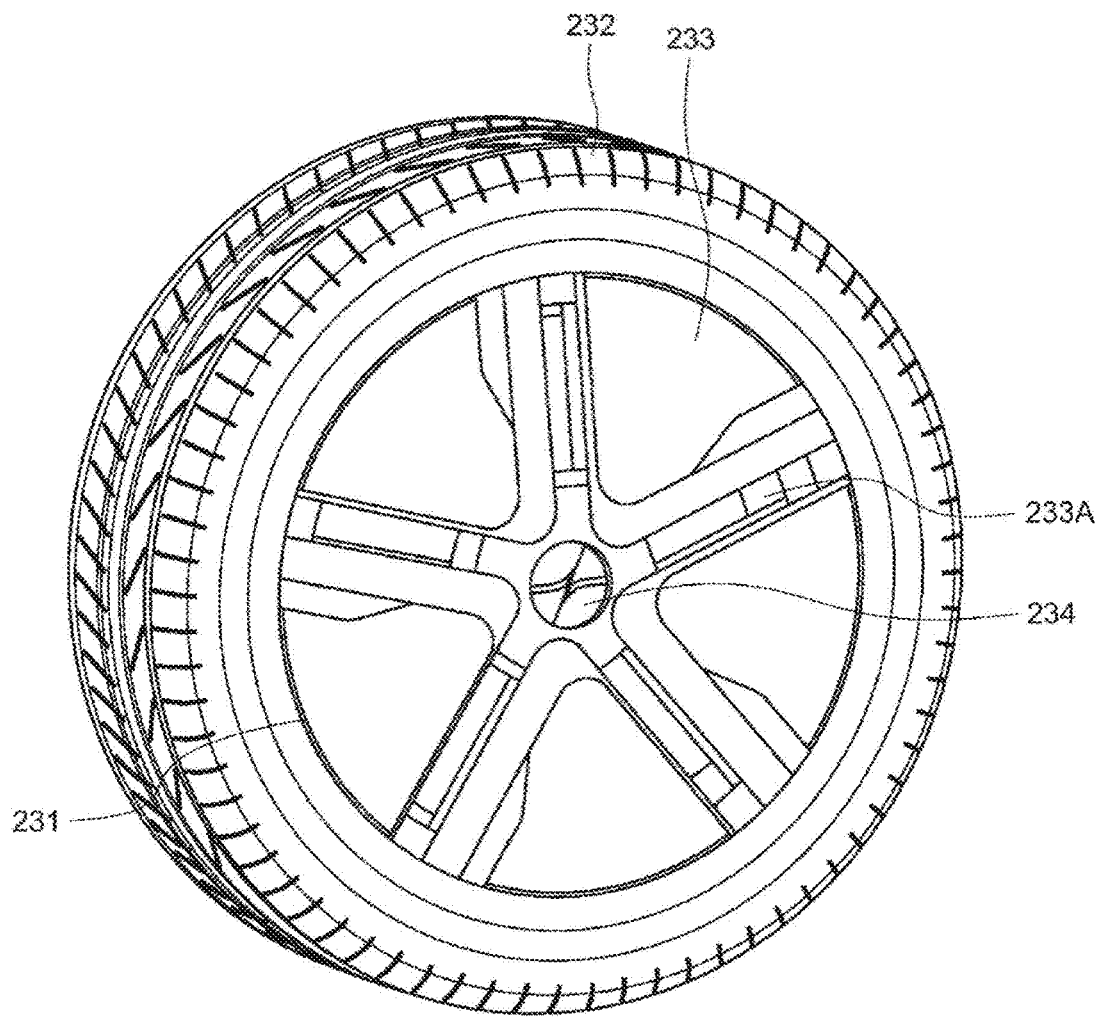
FIG. 11 is a schematic view illustrating an example configuration of a wheel, with a tire and wheel caps being attached thereto.

FIG. 11 is a schematic view illustrating an example configuration of the wheel 231, with a tire 232 and wheel caps 233 being attached thereto. FIG. 12 is a schematic view illustrating part of the example configuration of the wheel 231, with the wheel caps 233 being attached thereto but the tire 232 being removed. FIG. 13 is a schematic view illustrating part of the example configuration of the wheel 231, with the tire 232 and the wheel caps 233 being removed.

The wheel 231 is a five-spoke wheel including five spokes 231A. Each of the gaps between the spokes 231A is covered with the wheel cap 233. Each wheel cap 233 is screwed to the wheel 231 from the back side, and can be easily detached.

As the wheel caps 233 are attached to the wheel 231, the air resistance of the wheel 231 is reduced. Also, as the wheel caps 233 are detachable, designability is improved. For example, it is possible to change the impression of the exterior appearance of the vehicle 1 by attaching or detaching the wheel caps 233, or replacing the wheel caps 233 with wheel caps of a different design.

Further, SORPLAS (registered trademark) is used for the wheel caps 233, for example. SORPLAS is a recycled plastic containing waste plastics as a main raw material. SORPLAS has a maximum recycled material usage rate of 99%, for example, and the amount of addition of a flame retardant is smaller than that for other recycled plastics. That is, SORPLAS has a higher recycling rate than other recycled plastics. Also, as the amount of addition of the flame retardant is small, SORPLAS excels in recyclability, compared with other recycled plastics.

As SORPLAS is for the wheel caps 233, the weight of the wheel caps 233 is reduced, and the fuel consumption or the electricity consumption by the vehicle 1 is reduced. Also, the recycling rate and the recyclability of the wheel caps 233 are increased, which can contribute to realization of an environment-friendly, recycling-oriented society.

A center cap 234 is attached to the center of the wheel 231. A logo similar to the logo of the vehicle 1 illustrated in FIG. 3 is formed on the surface of the center cap 234.

<Example Configuration of the Interior of the Vehicle 1>

Next, an example configuration of the interior of the vehicle 1 is described with reference to FIGS. 14, 15, 16, 17, 18, 19, 20, 21, 22A, 22B, 23, and 24.

First, devices that are disposed along a loop line L11 are described with reference to FIGS. 14 to 17.

Figure 14:
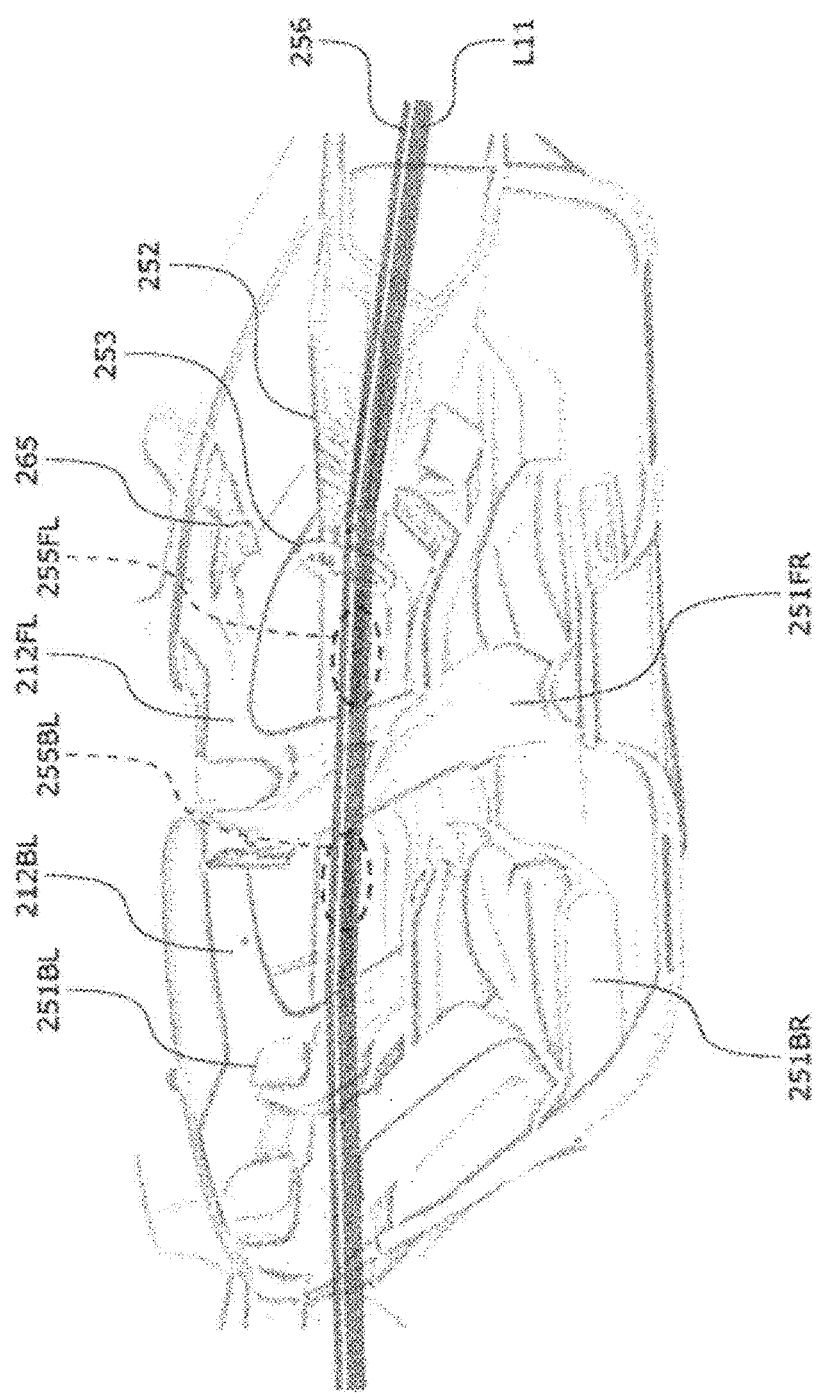
FIG. 14 is a schematic view of the inside of the vehicle as viewed from the right.
Figure 15:
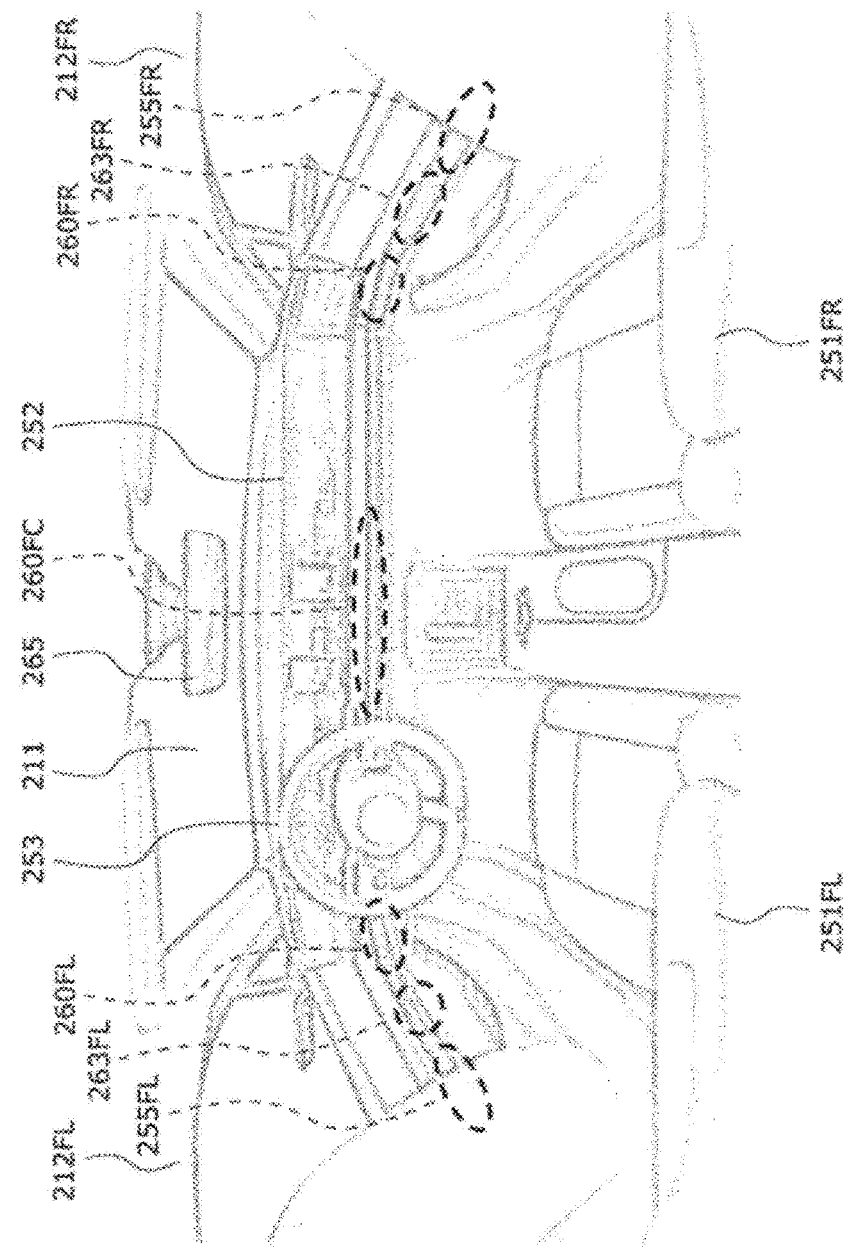
FIG. 15 is a schematic view of the vicinities of the driver's seat and the front passenger seat of the vehicle.
Figure 16:
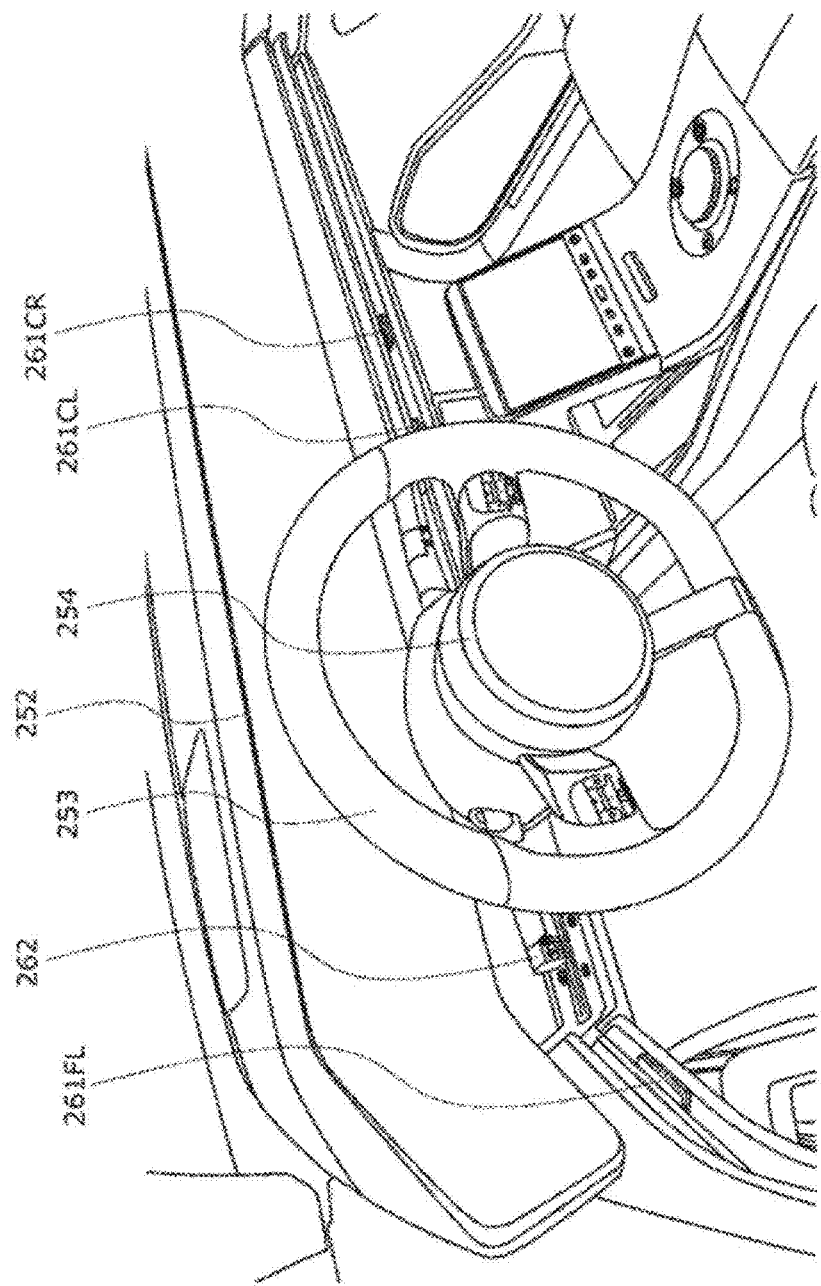
FIG. 16 is a schematic view of the vicinity of the dashboard of the vehicle.
Figure 17:
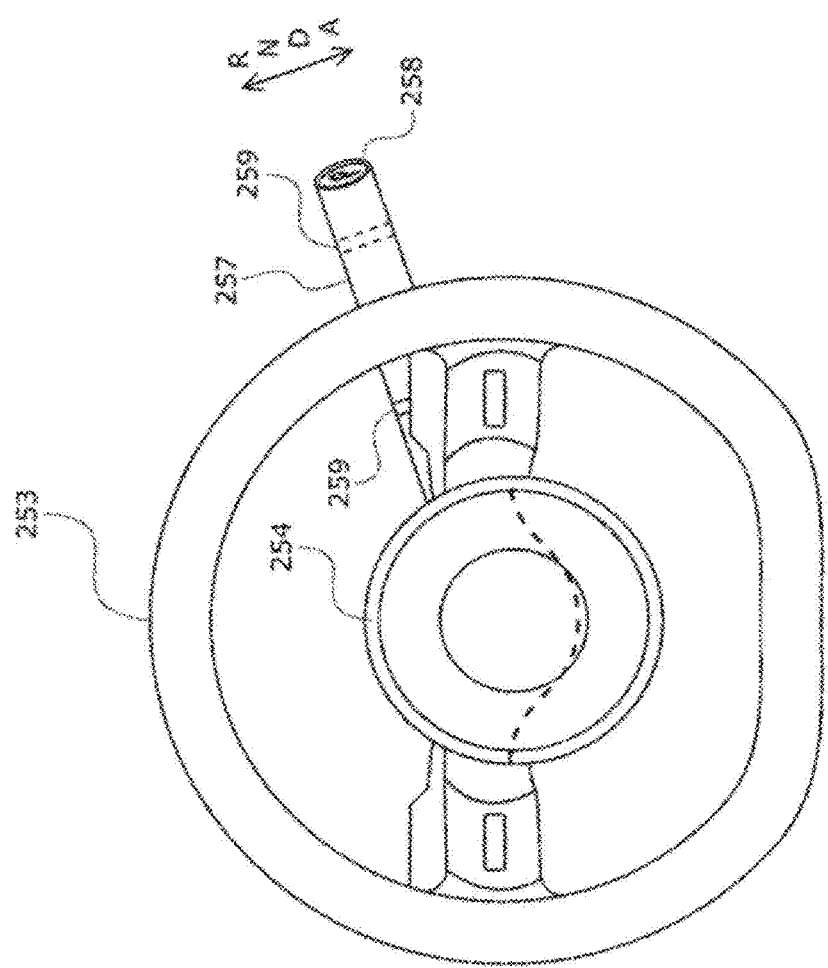
FIG. 17 is an enlarged view of the steering wheel of the vehicle.

FIG. 14 is a schematic view of the inside of the vehicle 1 as viewed from the right. FIG. 15 is a schematic view of the vicinities of a driver's seat 251FL and a front passenger seat 251FR of the vehicle 1. FIG. 16 is a schematic view of the vicinity of the dashboard of the vehicle 1. FIG. 17 is an enlarged view of a steering wheel 253 of the vehicle.

Inside the vehicle 1, a plurality of devices for user interfaces is disposed concentratedly along the loop line L11 (FIG. 14), which is a virtual line surrounding the periphery of the room in a substantially horizontal direction, and various kinds of interfaces are aggregated.

Here, the devices for user interfaces include an output device that outputs visual information, audio information, and haptic information, and an operation device to be used for various operations, for example. Further, being disposed along the loop line L11 includes not only the case of being disposed on the loop line L11 but also the case of being disposed near the loop line L11.

The loop line L11 is located at the same height as the loop line L1 outside the vehicle 1. Also, the loop line L11 is slightly inclined upward from the front toward the rear. This is because the positions of a back seat 251BL and a back seat 251BR are higher than the positions of the driver's seat 251FL and the front passenger seat 251FR.

For example, the display device forming the HMI 31 shown in FIG. 1 is disposed along the loop line L11.

For example, as illustrated in FIGS. 14 to 16, a center display 252 is disposed on the front surface of the dashboard in front of the driver's seat 251FL and the front passenger seat 251FR so as to extend in the vehicle width direction (lateral direction) immediately above the loop line L11.

The center display 252 is roughly divided into a left end portion, a center portion, and a right end portion, depending on the orientation of the display. The left end portion, the center portion, and the right end portion of the center display 252 can perform display independently of one another, and can perform display integrally. The left end portion and the right end portion of the center display 252 are used mainly as digital outer mirrors (electronic side mirrors), which are an alternative to conventional side mirrors. For example, the left end portion displays an image of the scene diagonally behind the vehicle 1 on the left, the image being captured by the camera 51SL (FIG. 3). The right end portion displays an image of the scene diagonally behind the vehicle 1 on the right side, the image being captured by the camera 51SR (FIG. 3).

Also, as illustrated in FIGS. 15 and 16, the steering wheel 253 is disposed on the loop line L11 in front of the driver's seat 251FL.

Further, as illustrated in FIGS. 16 and 17, an illumination 254 is provided along the periphery of the center portion of the steering wheel 253. The illumination 254 includes a plurality of LEDs arranged on a circumference along the periphery of the center portion of the steering wheel 253. Switching on and off, color, brightness, and the like of each LED can be controlled individually. Accordingly, the illumination 254 can change its color, brightness, and light emitting area (light emitting range).

Note that an airbag is contained in the center portion of the steering wheel 253. Further, when the airbag is in operation, the portion indicated by a dotted line in the center portion of the steering wheel 253 in FIG. 17 is broken. The illumination 254 is disposed so as to avoid the portion to be broken in the center portion. Thus, scattering of fragments of the illumination 254 and harmful substances can be prevented while the airbag is in operation.

Also, the speakers forming the HMI 31 shown in FIG. 1 are disposed along the loop line L11.

Specifically, as illustrated in FIGS. 14 and 15, a speaker 255FL is embedded near the loop line L11 inside the door 212FL on the side of the driver's seat 251FL. As illustrated in FIG. 15, a speaker 255FR is embedded near the loop line L11 inside the door 212FR on the side of the front passenger seat 251FR. As illustrated in FIG. 14, a speaker 255BL is embedded near the loop line L11 inside the door 212BL on the side of the left back seat 251BL. Although not shown in the drawings, a speaker 255BR is embedded near the loop line L11 inside the door 212BR on the side of the right back seat 251BR.

Although not shown in the drawings, speakers (hereinafter referred to as seat speakers) are also embedded below the respective headrests of the driver's seat 251FL, the front passenger seat 251FR, the back seat 251BL, and the back seat 251BR. Further, the shapes of the seats and the positions of the seat speakers are adjusted so that people of various heights (sitting heights) can clearly hear the sounds from the seat speakers of the respective seats.

The speakers 255FL to 255BR disposed along the loop line L11 are used to output sound directed to the entire room in the vehicle (all the occupants in the vehicle), for example.

Also, 360-degree real audio is realized by the speakers 255FL to 255FR. By realizing the 360-degree real audio, for example, it is possible to enjoy a moving image, music, and the like inside the vehicle with sound with realistic feeling. Also, a notification of the position of a dangerous object such as an obstacle existing around the vehicle 1 can be sent through the output direction of sound.

Meanwhile, the seat speakers of the respective seats are used mainly to output private sounds directed to the individual occupants sitting in the respective seats, for example. That is, sounds to be output from the respective seat speakers are controlled individually of one another.

Note that the arrangement of the speakers is an example, and can be changed. For example, the number of speakers disposed on the loop line L11 may be increased. For example, a speaker may be disposed on the dashboard in the front portion of the vehicle 1.

Further, as illustrated in FIG. 14, an ambient light 256 is provided so as to surround the inner periphery of the vehicle in substantially parallel to the loop line L11, slightly above the loop line L11 and at substantially the same height as the outside loop line L1. The ambient light 256 is a downlight including a plurality of LEDs embedded inside the vehicle so as to be arranged in a substantially horizontal direction, and is used mainly as an auxiliary illumination or an interior decoration. Switching on and off, color, brightness, and the like of each LED can be controlled individually.

Note that the ambient light 256 does not necessarily surround the entire inner periphery of the vehicle, and may surround part of the inner periphery of the vehicle without being continuous.

Further, various operation devices are disposed along the loop line L11.

For example, as described above, the steering wheel 253 is disposed on the loop line L11 in front of the driver's seat 251FL.

Furthermore, as illustrated in FIG. 17, a stalk lever 257, which is a rod-like operating member, is provided behind the steering wheel 253, so as to extend in the vehicle width direction (lateral direction (rightward direction)) from the steering column (not shown). The stalk lever 257 can be moved in the vertical direction, and the shift position of the vehicle 1 is switched when the stalk lever 257 is moved in the vertical direction. That is, the stalk lever 257 forms a tilt-type shift lever that is movable in the vertical direction. Note that the stalk lever 257 may be either a lever of a straight type that moves straight in the vertical direction or a lever of a column type that moves zigzag in the vertical direction, for example.

The order of the shift position setting to be performed with the stalk lever 257 is reverse (R), neutral (N), driving (D), and automated driving (A) from the top. That is, when the stalk lever 257 is moved in a downward direction from the top, the shift position is switched in the order of R, N, D, and A. When the stalk lever 257 is moved in an upward direction from the bottom, the shift position is switched in the order of A, D, N, and R.

Further, at the top end of the stalk lever 257, a button 258 that can be pressed in the axial direction of the stalk lever 257 is provided. When the button 258 is pressed, the shift position of the vehicle 1 is switched to parking (P).

Furthermore, an indicator 259 is provided circumferentially on the side surface of the stalk lever 257 in the circumferential direction. The indicator 259 is disposed at a position visible through a gap between spokes of the steering wheel 253 when viewed from the driver's seat 251FL.

The indicator 259 changes its color, depending on the set shift position. For example, in a case where the shift position is set to parking, the indicator 259 is red. In a case where the shift position is set to driving, the indicator 259 is white. In a case where the shift position is set to automated driving, and automated driving is possible, the indicator 259 is green. In a case where the shift position is set to automated driving, and automated driving is in operation, the indicator 259 is blue.

Note that, as indicated by dotted lines in FIG. 17, the indicator 259 may be disposed outside the outer periphery of the steering wheel 253 when viewed from the driver's seat 251FL. With this arrangement, the indicator 259 becomes visible from outside the steering wheel 253. Also, the indicator 259 may be disposed at both positions indicated by solid lines and the dotted lines.

As the indicator 259 is provided on an operating member (the stalk lever 257) to be used for switching shift positions, the driver can intuitively understand the meaning represented by the color of the indicator 259, and intuitively and reliably recognize the shift position.

Also, the setting state of the shift position may be displayed on the center display 252 or the like, for example. In this case, shift positions are displayed in the order of the direction of the setting performed with the stalk lever 257, for example. That is, shift positions are displayed in the order of reverse (R), neutral (N), driving (D), and automated driving (A) from the top.

Further, a dial that rotates about an axis (a circumferential direction) may be provided at the top end or in the middle of the stalk lever 257 in the axial direction, for example, and the dial may be rotated so that shift positions are switched.

Also, as illustrated in FIG. 15, an air conditioner (A/C) vent 260FC, an A/C vent 260FL, and an A/C vent 260FR of an air conditioner are disposed on the loop line L11. Specifically, the A/C vent 260FR is disposed immediately below the center display 252, between the driver's seat 251FL and the front passenger seat 251FR. The A/C vent 260FL is disposed immediately below the center display 252, near the joint portion of the door 212FL on the side of the driver's seat 251FL. The A/C vent 260FR is disposed immediately below the center display 252, near the joint portion of the door 212FR on the side of the front passenger seat 251FR.

Further, as illustrated in FIG. 16, the A/C vent 260FC has a knob 261CL and a knob 261CR for changing the wind direction. As illustrated in FIG. 16, the A/C vent 260FL has a knob 261FL for changing the wind direction. Although not shown in the drawings, the A/C vent 260FR has a knob 261FR for change the wind direction, at a position similar to that of the knob 261FL of the A/C vent 260FL. In this manner, the knob 261CL, the knob 261CR, the knob 261FL, and the knob 261FR are disposed on the loop line L11.

Also, as illustrated in FIG. 16, an operation unit 262 including switches and the like for performing various settings on the headlights 203 is disposed on the loop line L11 on the right side of the back of the steering wheel 253.

Further, door openers are disposed on the loop line L11. For example, as illustrated in FIG. 15, a door opener 263FL is disposed on the loop line L11, near the center of the door 212FL on the side of the driver's seat 251FL in the longitudinal direction. Likewise, a door opener 263FR is disposed on the loop line L11, near the center of the door 212FR on the side of the front passenger seat 251FR in the longitudinal direction.

As the devices and the like for various user interfaces are disposed along the loop line L11 in this manner, noise that would interfere with driving is removed from the line of sight of the driver, and an environment in which it is easy to concentrate on driving is provided. Also, as various devices are aggregated near the loop line L11, it becomes possible to intuitively recognize the positions of the various devices and operate the devices. Further, as the various devices are aggregated and the ambient light 256 is disposed in the vicinity of the loop line L11, an impression of the inside of the vehicle 1 being watched over is provided. Furthermore, vertical movement of the line of sight of an occupant such as the driver becomes smaller, and motion sickness of the occupant is prevented.

Figure 18:
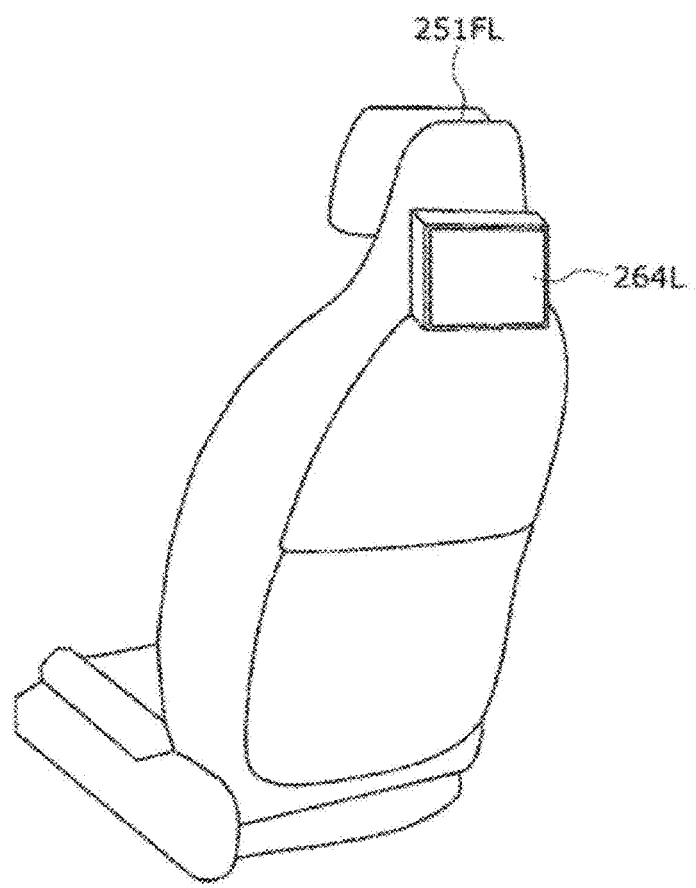
FIG. 18 is a view of the driver's seat as viewed from the rear on a diagonally left side.

FIG. 18 is a view of the driver's seat 251FL as viewed from the rear on the diagonally left.

A tablet terminal 264L is provided on the back surface of the driver's seat 251FL, or more specifically, is provided on the back surface of the headrest of the driver's seat 251FL.

For example, the tablet terminal 264L presents infotainment-related information to the occupant in the back seat 251BL, and accepts an operation performed in response to the presented information. Also, the tablet terminal 264L displays an alert at a time of emergency, danger, or the like, for example.

Note that, although not shown in the drawing, a tablet terminal 264R similar to the tablet terminal 264L is provided on the back surface of the front passenger seat 251FR, for example.

Also, ToF cameras may be provided in the vicinities of the tablet terminal 264L and the tablet terminal 264R, for example. With this arrangement, it becomes possible to perform recognition or the like of the occupants who are operating the tablet terminal 264L and the tablet terminal 264R, for example, on the basis of images captured by the ToF cameras.

Note that the driver's seat 251FL, the front passenger seat 251FR, the back seat 251BL, and the back seat 251BR will be hereinafter referred to simply as the seats 251 in a case where there is no need to distinguish the seats from one another.

Figure 20:
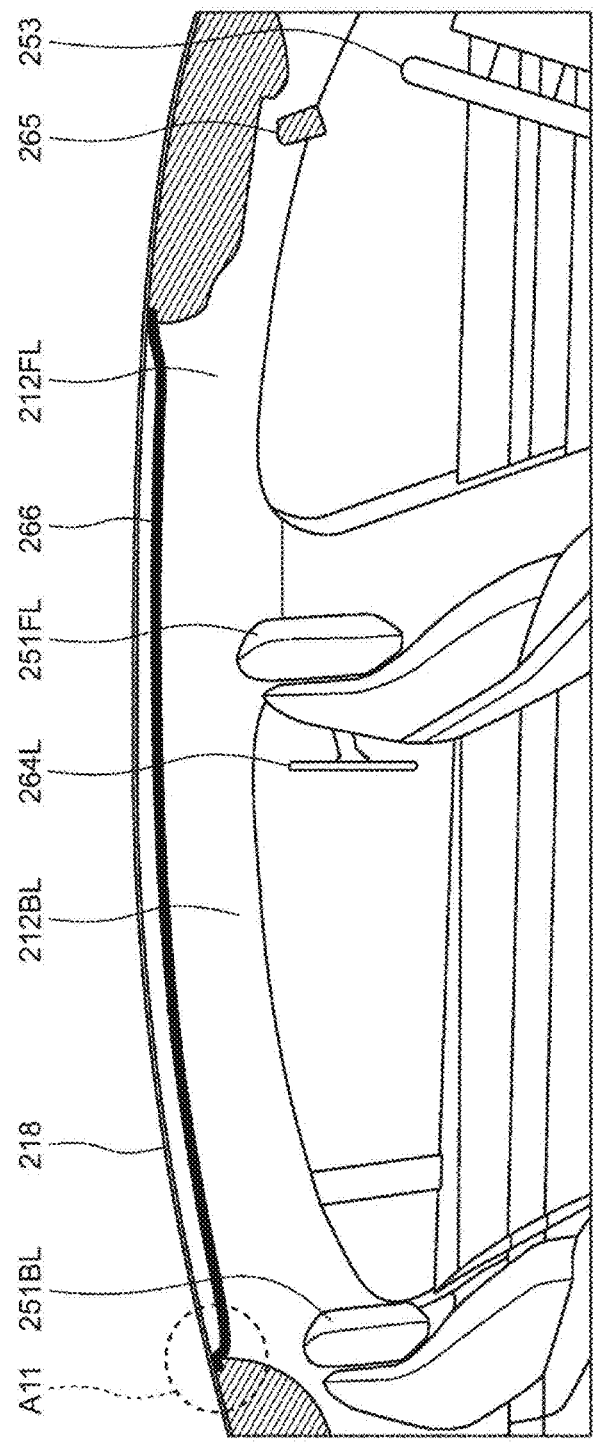
FIG. 20 is a cross-sectional view of the vicinity of the ceiling of the vehicle as viewed from the right.
Figure 21:
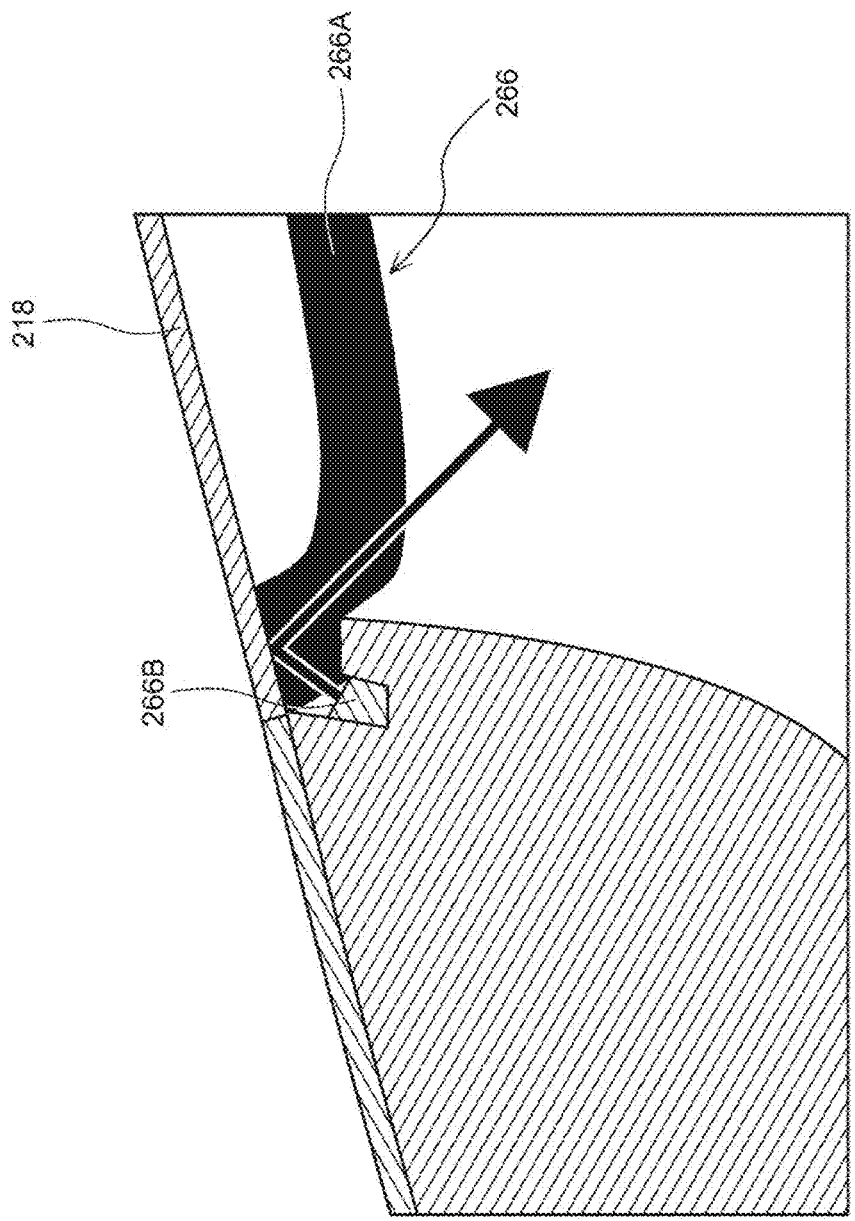
FIG. 21 is an enlarged view of part of FIG. 20.

Next, an example configuration of a roof light 266 is described with reference to FIGS. 19 to 21.

Figure 19:
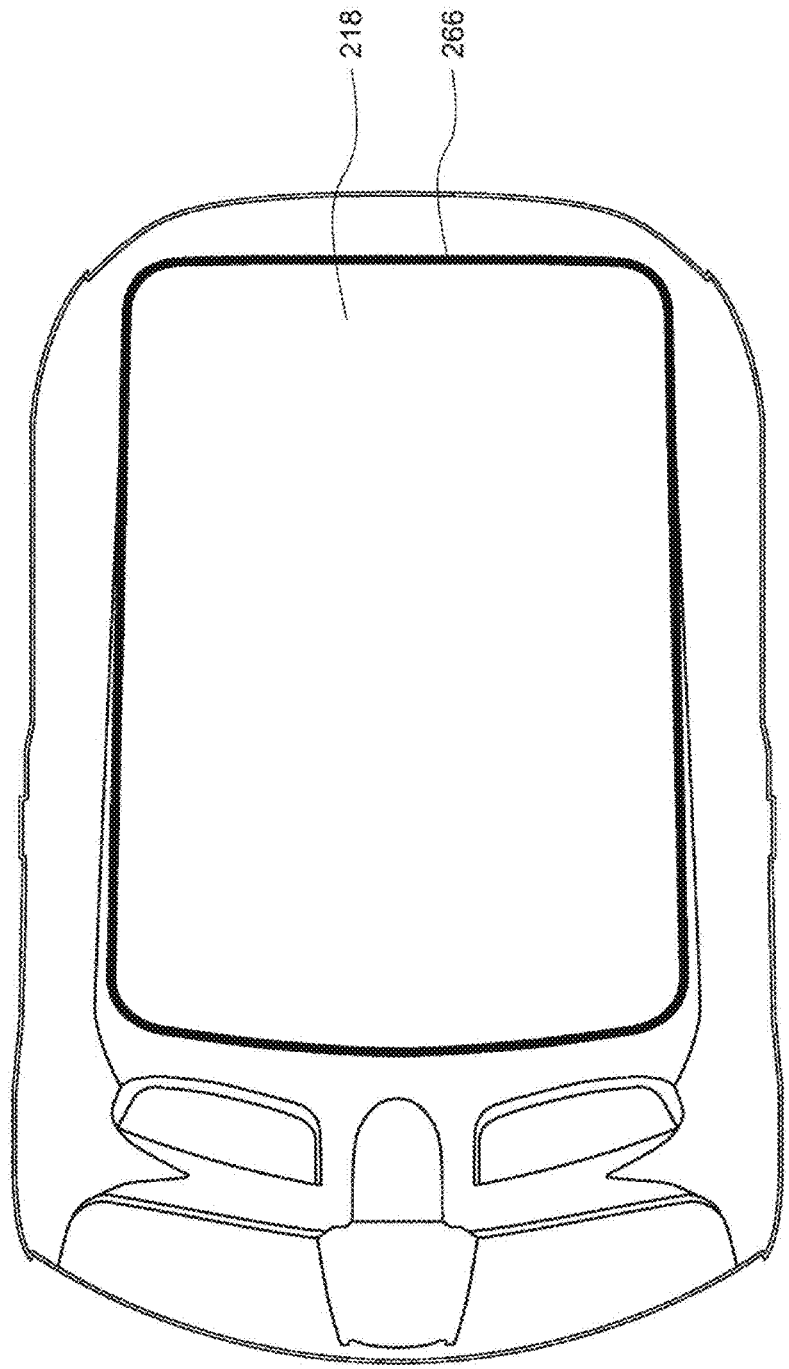
FIG. 19 is a schematic view illustrating an example configuration of the ceiling of the vehicle as looked up from inside the vehicle.

FIG. 19 is a schematic view illustrating an example configuration in a case where the ceiling of the vehicle 1 is viewed from inside the vehicle 1. FIG. 20 is a cross-sectional view of the vicinity of the ceiling of the vehicle 1 as viewed from the right. FIG. 21 is an enlarged view of the vicinity of an area A11 surrounded by a dotted circle in FIG. 20.

As illustrated in FIG. 19, the roof light 266 is disposed along the outer periphery of the roof window 218. As illustrated in FIG. 21, the roof light 266 includes a light emission portion 266A and a plurality of light sources 266B.

The light emission portion 266A is printed on the roof window 218 and/or the ceiling of the vehicle 1 with an appropriately prepared matte black coating material, for example, along the outer periphery of the roof window 218. Accordingly, the light emission portion 266A is disposed on the inner side and/or the outer side (ceiling) of the outer periphery of the roof window 218, along the outer periphery of the roof window 218. With this arrangement, the periphery of the transparent or semitransparent portion of the roof window 218 that transmits light is surrounded by the light emission portion 266A. When any light from each light source 266B is not being emitted, the light emission portion 266A is black and inconspicuous with no gloss.

For each light source 266B, an LED is used, for example. The respective light sources 266B are disposed outside and below the light emission portion 266A at predetermined intervals, so as to illuminate the light emission portion 266A from obliquely below, for example. When the light emission portion 266A is irradiated with light from each light source 266B, light is emitted from the light emission portion 266A (this light will be hereinafter referred to as the roof light), and the inside of the vehicle is illuminated with the roof light like indirect illumination.

For example, the roof light may be reflected light that is the light that has been emitted from each light source 266B been reflected by the light emission portion 266A, or may be light (fluorescent light, for example) emitted from the light emission portion 266A when the light from each light source 266B is emitted onto the light emission portion 266A. Also, the coating material to be used for the light emission portion 266A is appropriately prepared, so that the roof light is gradated.

Switching on and off, color, brightness, and the like of each light source 266B can be controlled individually. Thus, the light control unit 85 can control the position, brightness, color, and the like at and in which the light emission portion 266A emits light.

The roof light can be visually recognized not only from the inside of the vehicle 1 but also from the outside of the vehicle 1 through the windshield 211, the window 214FL, the window 214BL, the window 214FR, the window 214BR, the rear window 217, and the roof window 218, for example. For example, other vehicles and pedestrians passing by near the vehicle 1 can visually recognize the roof light through the windshield 211, the window 214FL, the window 214BL, the window 214FR, the window 214BR, or the rear window 217. Also, through the roof window 218, the roof light can be visually recognized from vehicles with high seat positions, such as trucks and buses.

Further, the roof light 266 near the driver's seat 251FL and the front passenger seat 251FR is not in a blind spot when viewed from the back seat 251BL and the back seat 251BR. Accordingly, the roof light emitted from the roof light 266 in the vicinities of the driver's seat 251FL and the front passenger seat 251FR is more easily viewed from the back seat 251BL and the back seat 251BR than the light emitted from the ambient light 256 (this light will be hereinafter referred to as the ambient light) in the vicinities of the driver's seat 251FL and the front passenger seat 251FR.

For example, in a case where the transmittance of the roof window 218 can be controlled, the body system control unit 84 can control the amount of roof light leaking to the outside of the vehicle 1 through the roof window 218, by controlling the transmittance of the roof window 218. For example, the body system control unit 84 can make the roof light visible from the outside through the roof window 218, and can also make the roof light invisible from the outside. Further, in a case where the transmittance of the roof window 218 can be controlled for each part, for example, the body system control unit 84 can prevent the roof light from leaking through the roof window 218, by making the peripheral portion of the roof window 218 opaque while keeping the center portion of the roof window 218 transparent.

Next, example configurations of floor mats installed in the vehicle 1 are described with reference to FIGS. 22A, 22B, 23, and 24.

Figure 22B:
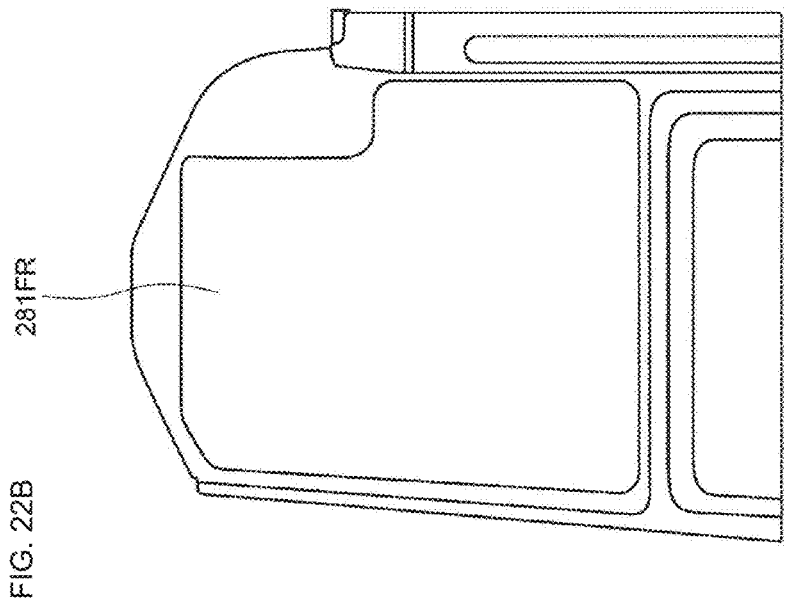
FIGS. 22A and 22B are schematic views illustrating example configurations of floor mats installed at the feet of the driver's seat and the front passenger seat.
Figure 22A:
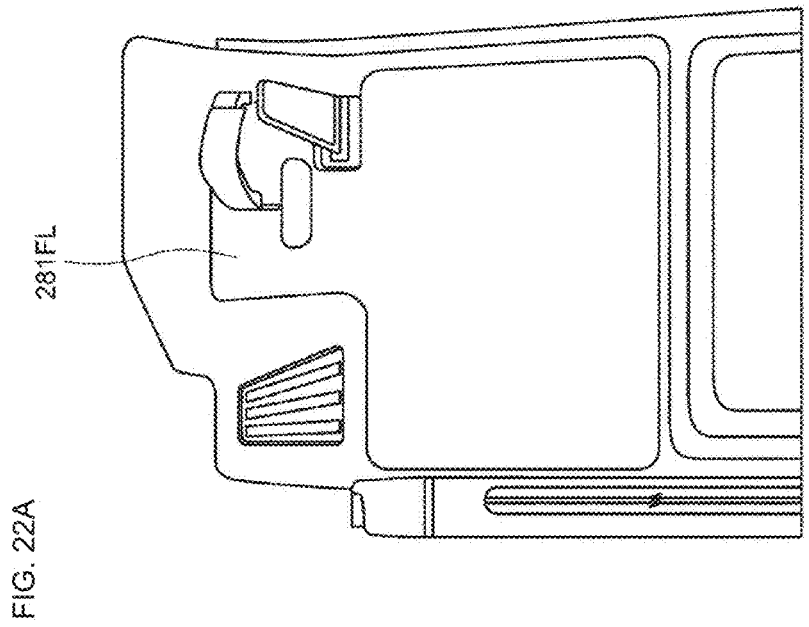
Figure 24:
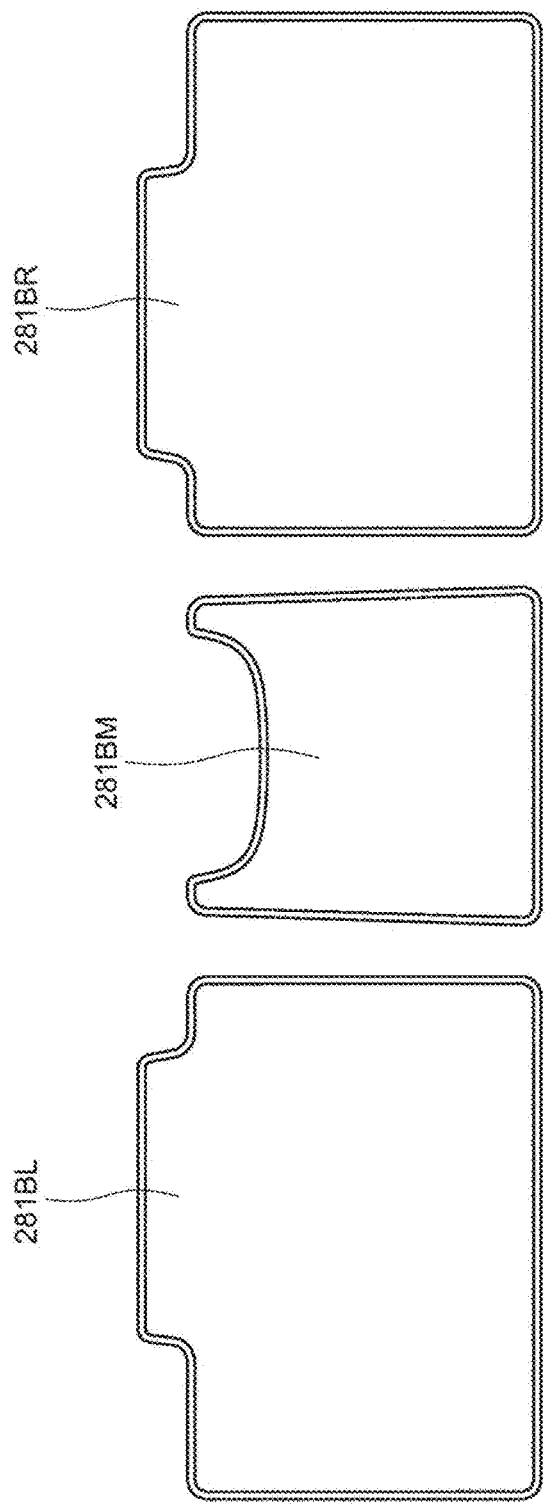
FIG. 24 is a plan view of floor mats.

FIG. 22A schematically illustrates an example configuration of a floor mat 281FL installed at the foot of the driver's seat 251FL. FIG. 22B schematically illustrates an example configuration of a floor mat 281FR installed at the foot of the front passenger seat 251FR. FIG. 23 shows a plan view of the floor mat 281FL and the floor mat 281FR. FIG. 24 shows a plan view of a floor mat 281BL, a floor mat 281BM, and a floor mat 281BR installed at the feet of the back seat 251BL and the back seat 251BR.

Note that the floor mat 281FL, the floor mat 281FR, the floor mat 281BL, the floor mat 281BM, and the floor mat 281BR will be hereinafter referred to simply as the floor mats 281 in a case where there is no need to distinguish them from one another.

For each floor mat 281, a special material called Triporous (registered trademark) having rice hulls as its raw material is used, for example. Having rice hulls as its raw material, Triporous has achieved a unique microstructure. Thus, Triporous can facilitate adsorption of substances that have been difficult to be adsorbed by conventional activated carbon, and increase the adsorption rate.

Accordingly, air purification, deodorization, and odor elimination in the vehicle are realized with the respective floor mats 281. Also, each floor mat 281 is detachable, and can be removed from the vehicle 1 and be washed. As each floor mat 281 is washed, clogging of Triporous is prevented, and the air purifying, deodorizing, and odor-eliminating functions of each floor mat 281 are maintained.

Further, as Triporous is used for each floor mat 281, rice hulls which are surplus biomass are reused, and it is possible to contribute to realization of an environment-friendly, recycling-oriented society.

Note that the shape of each floor mat 281 is not limited to any particular shape. For example, the floor mat 281BL, the floor mat 281BM, and the floor mat 281BR may not be separated, and may be formed with one floor mat.

<Light Emission Pattern of the Roof Light 266>

Next, an example of the light emission pattern of the roof light 266 is described with reference to FIG. 25.

Figure 25:
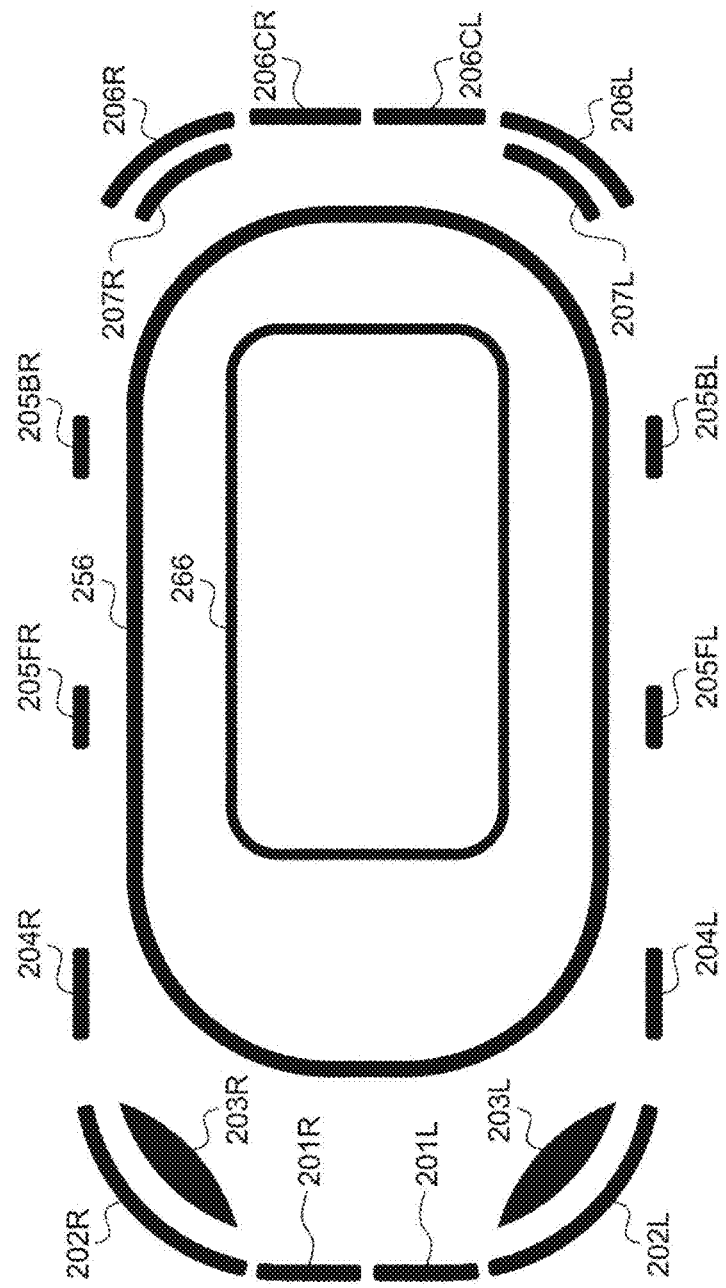
FIG. 25 is a schematic diagram illustrating the positions of the lights of the vehicle.

FIG. 25 schematically illustrates the positions of the lights of the vehicle 1. Specifically, the drawing schematically shows the positions of the accessory light 201L, the accessory light 201R, the day running light 202L, the day running light 202R, the headlights 203L, the headlights 203R, the turn signal 204L, the turn signal 204R, the auxiliary light 205FL, the auxiliary light 205FR, the auxiliary light 205BL, the auxiliary light 205BR, the taillight 206L, the taillight 206R, the taillight 206CL, the taillight 206CR, the brake lights 207L, the brake lights 207R, the ambient light 256, and the roof light 266.

Note that the headlight 203LU and the headlight 203LD, the headlight 203RU and the headlight 203RD, the brake light 207LU and the brake light 207LD, and the brake light 207RU and the brake light 207RD are not distinguished from each other, and are collectively shown as single lights.

The light emission pattern of each of the lights of the vehicle 1, including the roof light 266, is controlled by the light control unit 85 (FIG. 1). Also, the light emission pattern of each light is defined by the brightness and the color of light, temporal and spatial changes in the brightness and the color of light, the timing at which light blinks, and the like, for example.

<When the Doors 212 Are Unlocked, Locked, and Opened>

For example, the roof light 266 emits light in a predetermined light emission pattern when a door 212 is unlocked or locked.

Also, the light emission pattern of the roof light 266 changes with the method of unlocking the doors 212 and the method of locking the doors 212, for example. For example, the light emission pattern of the roof light 266 varies among a case where a door is unlocked with a dedicated smart key, a case where a door is unlocked with a general-purpose mobile terminal such as a smartphone, a case where a door is manually unlocked, and a case where a door is unlocked by some other method.

Here, a case where a door is manually unlocked is a case where a door 212 is unlocked by inserting a key to the vehicle 1 into a key cylinder of the door 212 as in a conventional vehicle, for example. A case where a door is unlocked by some other method is a case where a door is unlocked by a method other than assumed methods, and is a case where theft or the like is suspected, for example.

Further, in a case where a door is unlocked with a dedicated smart key or a general-purpose mobile terminal, for example, and the smart key or the mobile terminal approaches within a range of a predetermined distance from the vehicle 1, the roof light 266 starts to emit light in a predetermined light emission pattern before unlocking. After that, when the smart key or the mobile terminal further approaches the vehicle 1, and the door 212 is unlocked, the light emission pattern of the roof light 266 changes.

Note that, in a case where the doors 212 can be unlocked independently of one another, for example, the roof light 266 may emit light only in the vicinity of the unlocked door 212.

Also, when a door 212 is unlocked or locked, an exterior light and/or the ambient light 256 may cooperate with the roof light 266, to emit light in a predetermined light emission pattern. Further, in a case where the doors 212 can be unlocked independently of one another, an exterior light and/or the ambient light 256 may emit light only in the vicinity of the unlocked door 212.

<When the Brakes are Activated>

For example, when the brakes are activated, the roof light 266 cooperates with the brake lights 207L and the brake lights 207R, to emit light in a predetermined light emission pattern.

With this arrangement, the driver of the vehicle behind the vehicle 1 can recognize activation of the brakes of the vehicle 1 from the roof light 266 without fail, even if the vehicle height of the following vehicle is high, and it is difficult to visually recognize the brake lights 207L and the brake lights 207R, for example.

Note that the roof light 266 may emit light when the brakes are activated, only in a case where a vehicle having a large vehicle height is approaching the vehicle 1 from behind, for example. Specifically, the roof light 266 may emit light when the brakes are activated, only in a case where the recognition unit 73 recognizes that a vehicle with a predetermined vehicle height or greater exists within a range of a predetermined distance behind the vehicle 1, for example.

<When the Turn Signal is in Operation>

For example, when the turn signal is in operation, the roof light 266 emits light in a predetermined light emission pattern only in a portion corresponding to a turning direction or a lane changing direction of the vehicle 1.

Specifically, in a case where the vehicle 1 turns left or changes its course to the left, for example, the left half of the roof light 266 blinks in a predetermined light emission pattern, in cooperation with the day running light 202L, the turn signal 204L, and the taillight 206L, which are blinking in a predetermined light emission pattern.

Likewise, in a case where the vehicle 1 turns right or changes its course to the right, for example, the right half of the roof light 266 blinks in a predetermined light emission pattern, in cooperation with the day running light 202R, the turn signal 204R, and the taillight 206R, which are blinking in a predetermined light emission pattern.

With this arrangement, the driver of the vehicle behind the vehicle 1 can recognize a left turn or a lane change of the vehicle 1 from the roof light 266 without fail, even if the vehicle height of the following vehicle is high, and it is difficult to visually recognize the taillight 206L and the taillight 206R, for example.

Note that the roof light 266 may emit light when the turn signal is in operation, only in a case where a vehicle having a large vehicle height is approaching the vehicle 1 from behind, for example. Specifically, the roof light 266 may emit light when the turn signal is in operation, only in a case where the recognition unit 73 recognizes that a vehicle with a predetermined vehicle height or greater exists within a range of a predetermined distance behind the vehicle 1, for example.

<When the Driving Mode is Changed>

For example, when the driving mode of the vehicle 1 is changed, the roof light 266 emits light in a predetermined light emission pattern. For example, when the driving mode is changed from a manual driving mode to an automated driving mode, when the automated driving mode is changed to the manual driving mode, and when the level of the automated driving mode is changed, the roof light 266 emits light in a predetermined light emission pattern. In this case, the light emission pattern of the roof light 266 may be changed on the basis of the set driving mode, for example.

Thus, other occupants other than the driver can recognize a change of the driving mode.

Note that, when the driving mode of the vehicle 1 is changed, the ambient light 256 may emit light in a predetermined light emission pattern, in cooperation with the roof light 266.

<Control Based on States of the Vehicle 1 and the Inside of the Vehicle 1>

For example, the roof light 266 emits light in a predetermined light emission pattern, on the basis of the states of the vehicle 1 and the inside of the vehicle.

For example, the roof light 266 emits light in a predetermined light emission pattern, on the basis of the open/closed state of each door 212. Specifically, the roof light 266 emits light in a predetermined light emission pattern only in the vicinity of the door 212 that is ajar or the like, for example.

With this arrangement, the occupant can quickly recognize the position of the open door 212, and close the door as necessary. Also, the vehicle 1 is prevented from starting with the door left ajar, for example.

Note that the ambient light 256 near each door 212 may cooperate with the roof light 266, to emit light in a predetermined light emission pattern on the basis of the open/closed state of each door 212.

For example, the roof light 266 emits light in a predetermined light emission pattern, on the basis of the presence/absence of an occupant in each seat 251.

For example, in a case where the DMS 30 performs a process of recognizing an occupant in each seat 251, the roof light 266 emits light in a predetermined light emission pattern only in the vicinity of the seat 251 in which an occupant is recognized. Alternatively, in a case where the DMS 30 performs a process of recognizing each seat 251, for example, the roof light 266 emits light in a predetermined light emission pattern only in the vicinity of the seat 251 in which any occupant is not recognized.

As a result, an occupant can easily recognize the presence/absence of an occupant in each seat 251.

Note that the ambient light 256 near each seat 251 may cooperate with the roof light 266, to emit light in a predetermined light emission pattern on the basis of the presence/absence of an occupant in each seat 251.

For example, the roof light 266 emits light in a predetermined light emission pattern, on the basis of the charging status of the vehicle 1. Specifically, the roof light 266 emits light in a predetermined light emission pattern during charging of the vehicle 1, for example, and emits light in a different light emission pattern after the charging of the vehicle 1 is completed.

This facilitates recognition of the charging status of the vehicle 1.

Note that an exterior light and/or the ambient light 256 may cooperate with the roof light 266 to emit light in a predetermined light emission pattern, on the basis of the charging status of the vehicle 1.

For example, in a case where an emergency occurs in the vehicle 1, the roof light 266 emits light in a predetermined light emission pattern. An emergency may be a case where emergency evacuation driving or emergency braking is activated, a case where a button for reporting an emergency situation is pressed, or the like, for example. In this case, the light emission pattern of the roof light 266 may be changed on the basis of the type of emergency.

Note that, in a case where an emergency occurs in the vehicle 1, an exterior light and/or the ambient light 256 may cooperate with the roof light 266 to emit light in a predetermined light emission pattern.

<When an Object Approaches the Vehicle 1>

For example, in a case where the recognition unit 73 detects a predetermined object (such as a person, a vehicle, a motorcycle, a bicycle, or an obstacle, for example) approaching the vehicle 1, the exterior light near the position at which the approaching of the object is detected emits light in a predetermined light emission pattern.

Note that this function may be in operation only when the vehicle is parked, or may also be in operation when the vehicle is running. In a case where the function is in operation during running, the exterior light emits light in a light emission pattern that can be clearly distinguished from the brake lamps, the turn signals, and the like.

With this arrangement, it is possible to appeal to the surroundings that the vehicle 1 is monitoring the surroundings at the time of parking, for example, and thus, theft and destruction of the vehicle 1 can be prevented. It is also possible to notify another vehicle or the like of an abnormal approach of the other vehicle or the like to the vehicle 1, for example, and thus, rear-end collision or contact with the vehicle 1 can be prevented.

Here, in a case where the recognition unit 73 detects a predetermined object approaching the vehicle 1, for example, the roof light 266 may emit light in a predetermined light emission pattern in cooperation with an exterior light in the vicinity of the position at which the approach of the object is detected.

With this arrangement, it is possible to appeal to the surroundings that the vehicle 1 is also monitoring the inside of the vehicle at the time of parking, for example.

Also, it is possible to notify an occupant in the vehicle 1 of an abnormal approach of another vehicle or the like to the vehicle 1, for example, and the occupant can sense in advance the risk of rear-end collision or contact with another vehicle or the like. Thus, it is possible for the driver to perform driving to avoid rear-end collision or contact with another vehicle or the like, and, even if a collision or contact occurs, another occupant can take an action in advance so that damage such as injury is alleviated.

Further, in a case where another vehicle abnormally approaches the vehicle 1, the roof light 266 emits light, so that the light emission from the roof light 266 of the vehicle 1 is recorded in the drive recorder of the other vehicle, for example. Thus, it is possible to prove that the vehicle 1 has recognized the risk of another vehicle in advance, for example, and contribute to elucidation of the cause of the accident.

Note that, in a case where the recognition unit 73 detects a predetermined object approaching the vehicle 1, the ambient light 256 may further emit light in a predetermined light emission pattern in cooperation with an exterior light and the roof light 266, in the vicinity of the position at which the approach of the object is detected.

<Control in Cooperation with the Center Display 252>

For example, the light control unit 85 may control the roof light 266, on the basis of the display state of the center display 252.

Specifically, depending on the brightness and the color of the roof light, the roof light may be reflected on the center display 252, for example, and the visibility of the center display 252 may be degraded.

On the other hand, the light control unit 85 controls switching on/off, brightness, color, and the like of the roof light 266, on the basis of the display state (such as the presence/absence of display and the display content, for example) of the center display 252. For example, in a case where content is displayed at the center portion of the center display 252, the light control unit 85 turns off or darkens the roof light 266, or mutes the color shades.

Note that, in this case, the light control unit 85 does not necessarily control switching on/off, brightness, color, and the like of the entire roof light 266. For example, the light control unit 85 may control switching on/off, brightness, color, and the like of only the portion of the roof light 266 having great influence on the center display 252. That is, the light control unit 85 controls the portion of the roof light 266 to emit light, on the basis of the display state of the center display 252.

Further, the light control unit 85 may also control the roof light 266 on the basis of the display states of the tablet terminal 264L and the tablet terminal 264R, for example.

<Cooperation with In-Vehicle Entertainment>

For example, the roof light 266 can cooperate with in-vehicle entertainment.

Here, in-vehicle entertainment is entertainment content (such as video content and music content, for example) that is replayed in the vehicle, for example.

For example, the roof light 266 emits light in a pattern linked to the entertainment content being replayed in the vehicle, and thus, provides spatial presentation. Specifically, the color and the brightness of the roof light 266 change with the main color and the brightness of video content, for example. The light emission pattern of the roof light 266 changes with the tone or the rhythm of music content, for example.

Note that, like the roof light 266, the ambient light 256 may also emit light in cooperation with in-vehicle entertainment.

<Cooperation with the Vehicle 1 Being Operated with a Mobile Terminal>

In a case where the vehicle 1 is operated with a mobile terminal such as a smartphone, for example, the roof light 266 emits light in a predetermined light emission pattern in conjunction with the operation. In this case, the light emission pattern may be changed in accordance with the contents of the operation, for example.

Thus, the driver or the occupant sitting in the front passenger seat 251FR can easily recognize that an occupant has operated the vehicle 1 using a mobile terminal in the back seat 251BL or the back seat 251BR, for example.

Note that, when the vehicle 1 is operated with a mobile terminal, for example, the ambient light 256 may emit light in a predetermined light emission pattern, in cooperation with the roof light 266.

In the above manner, the roof light 266 can be effectively used for applications other than lighting and decoration in the vehicle.

As the roof light 266 cooperates with an exterior light and/or the ambient light 256, it is possible to increase the amount of information to be transmitted by light, and enhance the rapidity and certainty of information transmission.

3. Modifications

In the description below, modifications of the above embodiment of the present technology are explained.

For example, the roof light (hereinafter referred to as the in-vehicle roof light) emitted from the roof light 266 toward the inside of the vehicle, and the roof light (hereinafter referred to as the vehicle exterior roof light) emitted toward the outside of the vehicle via the roof window may be controlled independently of each other.

For example, a light source that illuminates the light emission portion 266A from obliquely above may be added. The light control unit 85 may then control the in-vehicle roof light by controlling the light source that illuminates the light emission portion 266A from obliquely below, and control the vehicle exterior roof light by controlling the light source that illuminates the light emission portion 266A from obliquely above.

Thus, roof light can be used in different applications and specifications for the inside of the vehicle and the outside of the vehicle, for example.

For example, the light source 266B may emit roof light directly to the inside or the outside of the vehicle, without the light emission portion 266A being provided in the roof light 266. In this case, different light sources 266B may be provided for the inside of the vehicle and the outside of the vehicle.

The roof light 266 is not necessarily disposed along the entire outer periphery of the roof window 218, and may be disposed along part of the outer periphery of the roof window 218.

For example, when a door 212 is opened or closed, at least one of the exterior light, the ambient light 256, and the roof light 266 may emit light in a light emission pattern corresponding to the opening/closing direction of the door 212.

For example, in a case where the door 212 is of a sliding type, in the vicinity of the door 212 that is opening, at least one of the exterior light, the ambient light 256, and the roof light 266 may emit light so that the light shifts in the moving direction of the door 212 as the door 212 opens. On the other hand, in the vicinity of the door 212 that is closing, at least one of the exterior light, the ambient light 256, and the roof light 266 may emit light so that the light shifts in the moving direction of the door 212 as the door 212 closes.

For example, the number of the spokes 231A of wheel 231 of the vehicle 1 is not limited to any particular number. Also, for example, the number and the shape of the wheel caps 233 change, as the number and the shape of the gaps between the spokes 231A change with the number of the spokes 231A of the wheel 231.

The vehicles to which the present technology can be applied are not limited to any particular ones, as long as each vehicle includes at least one of the roof light, the wheel, and the floor mat, for example.

4. Others

The series of processes described above can be performed by hardware, or can be performed by software. In a case where a series of processes is performed by software, the programs constituting the software are installed into a computer (such as the vehicle control ECU 21, for example).

Note that a program to be executed by the computer may be a program for performing processes in chronological order along the sequence described in the present specification, or a program for performing processes in parallel or at a necessary timing such as when a call is made.

Furthermore, in the present specification, a system is intended to mean assembly of a plurality of components (apparatuses, modules (parts), and the like) and it does not matter whether or not all the components are in the same housing. Therefore, a plurality of apparatuses accommodated in separate housings and connected via a network and one apparatus in which a plurality of modules is accommodated in one housing are both systems.

Further, embodiments of the present technology are not limited to the embodiment described above, and various modifications can be made without departing from the scope of the present technology.

For example, the present technology may be configured as cloud computing in which a function is shared by a plurality of devices through the network to process together.

Furthermore, each step described in the above-described flowchart can be executed by one apparatus, and also shared and executed by a plurality of apparatuses.

Moreover, in a case where a plurality of processing is included in one step, the plurality of processing included in the one step can be executed by one apparatus or shared and executed by a plurality of apparatuses.

Example Combinations of Configurations

The present technology may also provide configurations as described below.

(1)
A lighting control device including
a light control unit that controls a roof light disposed along an outer periphery of a roof window of a vehicle, on the basis of at least one of a state of the vehicle, a situation around the vehicle, a situation inside the vehicle, or an operation on the vehicle.

(2)
The lighting control device of (1), in which
the light control unit causes the roof light to emit light in a predetermined light emission pattern, at at least one of a time when a door of the vehicle is unlocked, a time when the door is locked, a time when a brake of the vehicle is activated, a time when a driving mode of the vehicle is changed, a time when an emergency occurs in the vehicle, a time when an approach of a predetermined object to the vehicle is detected, or a time when the vehicle is operated with a mobile terminal.

(3)
The lighting control device of (2), in which the light control unit changes the light emission pattern, on the basis of at least one of a method of unlocking the door or a method of locking the door.

(4)
The lighting control device of (2), in which,
in a case where the door is unlocked independently, the light control unit causes the roof light to emit light near the unlocked door.

(5)
The lighting control device of any one of (2) to (4), in which,
when the brake is activated, the light control unit causes the roof light to emit light in cooperation with a brake light of the vehicle.

(6)

The lighting control device of (5), in which, in a case where a vehicle with a predetermined vehicle height or greater is running behind the vehicle, and is present within a range of a predetermined distance from the vehicle, the light control unit causes the roof light to emit light when the brake is activated.

(7)

The lighting control device of any one of (2) to (6), in which, when a turn signal of the vehicle is in operation, the light control unit causes the roof light to emit light at a portion corresponding to a turning direction or a lane changing direction of the vehicle, in cooperation with the turn signal.

(8)

The lighting control device of (7), in which, in a case where a vehicle with a predetermined vehicle height or greater is running behind the vehicle, and is present within a range of a predetermined distance from the vehicle, the light control unit causes the roof light to emit light when the turn signal is in operation.

(9)

The lighting control device of any one of (2) to (8), in which the light control unit changes the light emission pattern, on the basis of a type of the emergency.

(10)

The lighting control device of any one of (2) to (9), in which the light control unit causes the roof light to emit light near a position at which an approach of the object is detected.

(11)

The lighting control device of any one of (2) to (10), in which the light control unit causes the roof light to emit light in conjunction with an operation of the vehicle being operated with the mobile terminal.

(12)

The lighting control device of any one of (1) to (11), in which, in a case where a door of the vehicle is open, the light control unit causes the roof light to emit light near the door that is open.

(13)

The lighting control device of any one of (1) to (12), in which, when an occupant in each seat in the vehicle is recognized, the light control unit causes the roof light to emit light in a predetermined light emission pattern, at one of a position near the seat in which an occupant is recognized, or a position near a seat in which an occupant is not recognized.

(14)

The lighting control device of any one of (1) to (13), in which the light control unit causes the roof light to emit light in a light emission pattern based on a charging status of the vehicle.

(15)

The lighting control device of any one of (1) to (14), in which the light control unit controls at least one of switching on and off, brightness, or color of the roof light, or a portion of the roof light to be made to emit light, on the basis of a display state of a display in the vehicle.

(16)

The lighting control device of any one of (1) to (15), in which the light control unit causes the roof light to emit light in cooperation with at least one of an exterior light disposed along a virtual first line surrounding a periphery of a body of the vehicle in a substantially horizontal direction, or an ambient light disposed along a virtual second line surrounding an inner periphery of the vehicle in a substantially horizontal direction.

(17)

The lighting control device of any one of (1) to (16), further including a body system control unit that controls a transmittance of the roof window, to control an amount of light of the roof light leaking to outside the vehicle through the roof window.

(18)

The lighting control device of any one of (1) to (17), in which the light control unit controls light emitted from the roof light toward inside of the vehicle and light emitted from the roof light toward outside of the vehicle through the roof window, independently of each other.

(19)

A lighting control method including controlling a roof light disposed along an outer periphery of a roof window of a vehicle, on the basis of at least one of a state of the vehicle, a situation around the vehicle, a situation inside the vehicle, or an operation on the vehicle.

(20)

A vehicle that has a roof window, the vehicle including:

a roof light disposed along an outer periphery of the roof window; and a light control unit that controls the roof light, on the basis of at least one of a state of the vehicle, a situation around the vehicle, a situation inside the vehicle, or an operation on the vehicle.

Note that the effects described in the present specification are merely examples and are not limited, and other effects may be achieved.

REFERENCE SIGNS LIST

1 Vehicle
11 Vehicle control system
21 Vehicle control ECU
30 DMS
31 HMI
73 Recognition unit
84 Body system control unit
85 Light control unit
201 Accessory light
202 Day running light
203 Headlight
204 Turn signal
205 Auxiliary light
206 Taillight
207 Brake light
218 Roof window
231 Wheel
231A Spoke
233 Wheel cap
252 Center display
256 Ambient light 265 Tablet terminal
266 Roof light
265A Light emission portion
266B Light source
281FL to 281BR Floor mat

The invention claimed is:

1. A lighting control device, comprising:
a light control unit configured to:
control a roof light along an outer periphery of a roof window of a first vehicle, based on at least one of a state of the first vehicle, a situation around the first vehicle, a situation inside the first vehicle, or an operation on the first vehicle, wherein
the situation inside the first vehicle includes a first recognition of each seat of a plurality of seats inside the first vehicle and a second recognition of a presence or an absence of an occupant in the each seat of the plurality of seats;
control emission of first light of the roof light in a first light emission pattern at a first position in a first vicinity of a first seat of the plurality of seats in which the occupant is absent; and
control the emission of the first light of the roof light in a second light emission pattern, at least one of at a first time at which a door of the first vehicle is unlocked, at a second time at which the door is locked, at a third time at which a brake of the first vehicle is activated, at a fourth time at which a driving mode of the first vehicle is changed, at a fifth time at which an emergency occurs in the first vehicle, at a sixth time at which an approach of a specific object to the first vehicle is detected, or at a seventh time at which the first vehicle is operated with a mobile terminal.

2. The lighting control device according to claim 1, wherein
the light control unit is further configured to change the second light emission pattern, based on at least one of a method to unlock the door or a method to lock the door.

3. The lighting control device according to claim 1, wherein,
in a case where the door is unlocked independently, the light control unit is further configured to control the emission of the first light of the roof light in the second light emission pattern in a second vicinity of the unlocked door.

4. The lighting control device according to claim 1, wherein,
in a case where the brake is activated, the light control unit is further configured to control the emission of the first light of the roof light in the second light emission pattern in cooperation with a brake light of the first vehicle.

5. The lighting control device according to claim 4, wherein,
in a case where a second vehicle with a specific vehicle height or greater runs behind the first vehicle, and is within a range of a specific distance from the first vehicle, the light control unit is further configured to control, based on activation of the brake, the emission of the first light of the roof light in the second light emission pattern.

6. The lighting control device according to claim 1, wherein,
in a case where a turn signal of the first vehicle is in operation, the light control unit is further configured to control, in cooperation with the turn signal, the emission of the first light of the roof light in the second light emission pattern, wherein the first light is emitted at least at one of a portion corresponding to a turning direction or at a lane changing direction of the first vehicle.

7. The lighting control device according to claim 6, wherein,
in a case where a second vehicle with a specific vehicle height or greater runs behind the first vehicle, and is within a range of a specific distance from the first vehicle, the light control unit is further configured to control, based on the operation of the turn signal, the emission of the first light of the roof light in the second light emission pattern.

8. The lighting control device according to claim 1, wherein
the light control unit is further configured to change the second light emission pattern of the first light, based on a type of the emergency.

9. The lighting control device according to claim 1, wherein
the light control unit is further configured to control the emission of the first light of the roof light in the second light emission pattern in a second vicinity of a second position at which the approach of the specific object is detected.

10. The lighting control device according to claim 1, wherein
the light control unit is further configured to control, based on the operation of the first vehicle operated by the mobile terminal, the emission of the first light of the roof light in the second light emission pattern.

11. The lighting control device according to claim 1, wherein,
in a case where the door of the first vehicle is open, the light control unit is further configured to control the emission of the first light of the roof light in the first light emission pattern in a second vicinity of the door that is open.

12. The lighting control device according to claim 1, wherein,
the light control unit is further configured to control the emission of the first light of the roof light in a third light emission pattern, at a second position in a second vicinity of a second seat of the plurality of seats in which the occupant is present.

13. The lighting control device according to claim 1, wherein
the light control unit is further configured to control, based on a charging status of the first vehicle, the emission of the first light of the roof light in a third light emission pattern.

14. The lighting control device according to claim 1, wherein
the light control unit is further configured to control, based on a display state of a display in the first vehicle, at least one of a switching operation of the roof light to on and off, brightness of the roof light, color of the roof light, or a portion of the roof light.

15. The lighting control device according to claim 1, wherein the light control unit is further configured to control the emission of the first light of the roof light in the first light emission pattern in cooperation with at least one of
an exterior light along a virtual first line around a periphery of a body of the first vehicle in a horizontal direction, or an ambient light along a virtual second line around an inner periphery of the first vehicle in the horizontal direction.

16. The lighting control device according to claim 1, further comprising
a body system control unit configured to control a transmittance of the roof window, to control an amount of the first light of the roof light that leaks to outside of the first vehicle through the roof window.

17. The lighting control device according to claim 1, wherein
the light control unit is further configured to control the first light emitted from the roof light toward inside of the first vehicle and second light emitted from the roof light toward outside of the first vehicle through the roof window, and
the first light is independent of the second light.

18. A lighting control method, comprising:
controlling a roof light along an outer periphery of a roof window of a vehicle, based on at least one of a state of the vehicle, a situation around the vehicle, a situation inside the vehicle, or an operation on the vehicle, wherein
the situation inside the vehicle includes a first recognition of each seat of a plurality of seats inside the vehicle and a second recognition of a presence or an absence of an occupant in the each seat of the plurality of seats;
controlling emission of light of the roof light in a first light emission pattern at a position in a vicinity of a seat of the plurality of seats in which the occupant is absent; and
controlling the emission of the light of the roof light in a second light emission pattern, at least one of at a first time at which a door of the vehicle is unlocked, at a second time at which the door is locked, at a third time at which a brake of the vehicle is activated, at a fourth time at which a driving mode of the vehicle is changed, at a fifth time at which an emergency occurs in the vehicle, at a sixth time at which an approach of a specific object to the vehicle is detected, or at a seventh time at which the vehicle is operated with a mobile terminal.

19. A vehicle that has a roof window,
the vehicle comprising:
a roof light along an outer periphery of the roof window; and
a light control unit configured to:
control the roof light, based on at least one of a state of the vehicle, a situation around the vehicle, a situation inside the vehicle, or an operation on the vehicle, wherein
the situation inside the vehicle includes a first recognition of each seat of a plurality of seats inside the vehicle and a second recognition of a presence or an absence of an occupant in the each seat of the plurality of seats;
control emission of light of the roof light in a first light emission pattern at a position in a vicinity of a seat of the plurality of seats in which the occupant is absent; and
control the emission of the light of the roof light in a second light emission pattern, at least one of at a first time at which a door of the vehicle is unlocked, at a second time at which the door is locked, at a third time at which a brake of the vehicle is activated, at a fourth time at which a driving mode of the vehicle is changed, at a fifth time at which an emergency occurs in the vehicle, at a sixth time at which an approach of a specific object to the vehicle is detected, or at a seventh time at which the vehicle is operated with a mobile terminal.

\* \* \* \* \*